US008117332B2

(12) United States Patent
Riggert et al.

(10) Patent No.: US 8,117,332 B2
(45) Date of Patent: Feb. 14, 2012

(54) NETWORK STREAMING OVER MULTIPLE PHYSICAL INTERFACES

(75) Inventors: Eric Riggert, Lake Forest, CA (US); Martin Martinez, Ladera Ranch, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 123 days.

(21) Appl. No.: 12/766,819

(22) Filed: Apr. 23, 2010

(65) Prior Publication Data

US 2011/0264818 A1  Oct. 27, 2011

(51) Int. Cl.
*G06F 15/16* (2006.01)
*G06F 12/00* (2006.01)

(52) U.S. Cl. ......................... 709/231; 710/310
(58) Field of Classification Search .................. 709/231, 709/232, 227–228, 250
See application file for complete search history.

(56) References Cited

U.S. PATENT DOCUMENTS

| | | | |
|---|---|---|---|
| 5,402,416 A | | 3/1995 | Cieslak et al. |
| 7,420,919 B1 * | | 9/2008 | Toudeh-Fallah et al. ..... 370/235 |
| 7,581,019 B1 * | | 8/2009 | Amir et al. ..................... 709/235 |
| 2005/0002453 A1 * | | 1/2005 | Chang et al. ............. 375/240.03 |
| 2006/0104397 A1 * | | 5/2006 | Lottis et al. .................... 375/372 |
| 2007/0204137 A1 * | | 8/2007 | Tran .............................. 712/214 |
| 2008/0256272 A1 * | | 10/2008 | Kampmann et al. ............ 710/57 |

OTHER PUBLICATIONS

Nicola Baldo, et al., "RTCP Feedback Based Transmission Rate Control for 3G Wireless Multimedia Streaming", IEEE, 2004, pp. 1817 to 1821.

* cited by examiner

*Primary Examiner* — Zarni Maung
(74) *Attorney, Agent, or Firm* — Fitzpatrick, Cella, Harper & Scinto

(57) ABSTRACT

The present disclosure is directed to controlling a sending of a single data stream from a sending endpoint to a receiving endpoint. Both of the endpoints each have multiple physical interfaces connecting each endpoint to one or more networks. A buffer size is selected for a buffer at the receiving endpoint, and an estimation is made by the receiving endpoint of a fill rate of the buffer. The estimated fill rate is then compared with a target fill rate. Feedback is then sent by the receiving endpoint over one or more of the physical interfaces instructing the sending endpoint to reduce or increase a rate at which data is being sent, if the estimated fill rate is more than the target fill rate or the estimated fill rate is less than the target fill rate, respectively. The splitting and sending of data is then adjusted according to the feedback.

70 Claims, 16 Drawing Sheets

NETWORK STREAMING OVER MULTIPLE PHYSICAL INTERFACES

BACKGROUND

1. Field

The present disclosure generally relates to network streaming, and more specifically relates to network streaming from a sending endpoint to a receiving endpoint in an embedded system with an embedded buffer.

2. Description of the Related Art

In the field of data streaming over a network, there is a problem in that data streaming from a sending endpoint to a recipient endpoint may be detrimentally affected by a variety of effects such as limited network bandwidth, collisions in data transmission, and latency, which in turn affect the delivery quality of the streamed data. In the future, network bandwidth will invariably increase, which might suggest that this problem will become less significant in the future. In fact, however, recent history has shown that the quantity of data information that needs to be sent over networks grows much faster than does the delivery infrastructure, such that it is expected that this problem will persist. As the quantity of data information continues to increase (e.g., High Definition video streaming), an already overburdened system may provide less than adequate data delivery and/or playback quality, or may fail outright.

SUMMARY

The inventors herein have proposed arrangements that address this problem in a situation where the architecture of the network is such that the sender and the recipient both have multiple physical connections to the network, and/or in situations where there are one or more networks that connect the sender and recipient, and both the sender and recipient each have one or more physical connections to each network. For example, the sender and recipient might be connected over four separate networks including, such as, an Ethernet network, a MoCA (Multimedia over Coax Alliance) network, an Ethernet over powerline network, a HomePNA (Home Phoneline Networking Alliance) network, and/or a wireless network. For each network, both sender and recipient each have one or more physical connections to each network, such as twisted pair cable connecting to the Ethernet network, coaxial cable connecting to the MoCA network, power lines/wires connecting to the Ethernet over powerline network, and one or more radio antennas connecting to the wireless network.

With such an architecture, the single data stream is split into sub-streams and sent over multiple physical interfaces which connect the endpoints of the network, instead of streaming data over only one of the possible physical interfaces. This arrangement is more flexible and resilient to network load or impairments because multiple physical interfaces are used simultaneously.

However, using multiple physical interfaces raises a new set of challenges, and more specifically, raises a new set of challenges in embedded systems. This is because embedded systems typically have an architecture which includes one system or data bus which is shared by a number of interfaces, such that the shared bus may become overloaded with data causing congestion in the bus. As such, one of the challenges is that in an example in which the multiple physical interfaces are presenting data at a fast rate to a CPU on the receiving endpoint from different interfaces simultaneously, the CPU may be overwhelmed with an amount of data to be handled and/or transferred across the shared bus. This is particularly true in embedded systems in which a mass storage (i.e., a hard drive), which shares the same bus as the CPU and the number of interfaces, is used to buffer data. Using the mass storage to buffer data by sending data to and retrieving data from the mass storage can be a slow process, and can further overwhelm the CPU or an available bus bandwidth. As a result, playback of the streaming data may incur stumbles or stutters, even if the CPU is provided with a mass storage buffer.

In the present disclosure, the foregoing challenge is addressed by controlling a sending of a single data stream from a sending endpoint to a receiving endpoint, in which both of the sending endpoint and the receiving endpoint each have multiple physical interfaces connecting the sending endpoint and the receiving endpoint to one or more networks, respectively. Feedback is provided to the sending endpoint instructing to reduce a rate at which data is being streamed, in a case that an estimated fill rate is more than a target fill rate for a buffer having a selected buffer size at the receiving endpoint. In addition, feedback is provided to the sending endpoint instructing to increase the rate at which data is being streamed, in a case that the estimated fill rate is less than the target fill rate for the buffer.

Thus, in an example embodiment described herein, a buffer size is selected for a buffer at the receiving endpoint. An estimation is then made as to a fill rate of the buffer, and the estimated fill rate is compared with a target fill rate. In this example embodiment, the target fill rate is zero. However, in other example embodiments, the target fill rate may be slightly more than or slightly less than zero. In a case where the estimated fill rate is more than the target fill rate, feedback is sent over one or more of the multiple physical interfaces from the receiving endpoint to the sending endpoint instructing to reduce a rate at which the data is streamed. In a case where the estimated fill rate is less than the target fill rate, feedback is sent over one or more of the multiple physical interfaces from the receiving endpoint to the sending endpoint instructing to increase the rate at which the data is streamed. An adjustment is then made as to the splitting and sending of data over the multiple physical interfaces from the sending endpoint to the receiving endpoint so as to reduce or increase the rate at which the data is streamed in accordance with the feedback.

In one example embodiment described herein, the receiving endpoint is an embedded system. The embedded system has an architecture that includes a bus which is shared by a CPU and multiple other interfaces. For example, the bus may be a system bus or data bus that is shared by a mass storage (i.e., a hard drive) interface and multiple ports included in the plurality of physical interfaces.

By virtue of the foregoing arrangement, it is ordinarily possible to efficiently provide data playback for data being streamed from a sending endpoint to a receiving endpoint over multiple physical interfaces without relying on a large buffer at the receiving endpoint. More specifically, since feedback is provided from the receiving endpoint to the sending endpoint instructing to increase or reduce a rate at which data is being streamed when an estimated fill rate is less than or more than a target fill rate, respectively, for a buffer at the receiving endpoint, it is possible for a CPU on the receiving endpoint to operate within its limits, and not be overburdened. As a result, efficient and high quality streaming data can be provided, ordinarily without using mass storage and/or a fast/expensive CPU. Moreover, because the CPU is not being overburdened, and particularly for an embedded system, because the shared bus is not being congested with data, the receiving endpoint can play back data with little to no perceived delay, and with less delay between a user input and a response to the user's input.

In another example embodiment described herein, the buffer size for the buffer is selected based at least partially on a data playback rate of the streaming data, and a typical feedback response time for feedback sent from the receiving endpoint to the sending endpoint. Because the buffer size is selected based on a typical feedback response time for feedback sent from the receiving endpoint to the sending endpoint, a buffer size may be selected that provides a cushion of memory to allow the sending of the data stream to be adjusted before, for example, the buffer incurs data overflow.

In an additional example embodiment described herein, the buffer is an elastic embedded buffer included in the receiving endpoint. Alternatively, the buffer may be a fixed embedded buffer included in the receiving endpoint.

In yet another example embodiment described herein, in the case where the estimated fill rate is substantially less than the target fill rate, the feedback will prompt the sending endpoint to send a burst of data from the sending endpoint to the receiving endpoint for an amount of time such that the buffer is replenished with data. In one case, the feedback is sent over one or more physical interfaces instructing the sending endpoint to send a burst of data, after a prediction is made of a future underrun of data in the buffer.

In a different situation, where the buffer with the selected buffer size receives more data than it can hold, the buffer discards overflowing data. Feedback is then sent over one or more physical interfaces from the receiving endpoint to the sending endpoint instructing the sending endpoint to resend the discarded data. In some cases, the sending endpoint may instruct the sending endpoint to resend the discarded data after a delay in time. This delay in time can prevent a possible subsequent overflow of data caused by the resending of data.

According to another example embodiment described herein, in a case that a packet of data sent from the sending endpoint has been lost or corrupted, and it is determined that the packet of data should be received by the receiving endpoint, feedback is sent from the receiving endpoint to the sending endpoint to resend the lost or corrupted packet of data. Alternatively, the lost or corrupted data packet may simply be discarded.

In an additional example embodiment described herein, the fill rate is estimated by first estimating a data playback rate (i.e., consumption rate) of the data stored in the buffer. The data playback rate is estimated by the receiving endpoint by observing a rate at which an application of the receiving endpoint draws data from the buffer when the data is to be played. Then, an incoming data rate of the buffer is estimated. The incoming data rate is estimated by the receiving endpoint by observing a rate at which data, which is received over the multiple physical interfaces and recombined at the receiving endpoint, is placed in the buffer. The estimated fill rate is then obtained by taking the difference between the estimated data playback rate and the estimated incoming data rate. In a simple example, if the incoming data rate is estimated to be 5 Mb/sec, and the data playback rate is estimated to be 4 Mb/sec, then the fill rate of the buffer would be around +1 Mb/sec. In this same example, if the incoming data rate is estimated to be 3 Mb/sec, and the data playback rate remains at 4 Mb/sec, then the fill rate of the buffer would be around −1 Mb/sec.

According to another example embodiment described herein, the buffer is an elastic embedded buffer included in the receiving endpoint. In this example embodiment, if an underrun of data occurs in the elastic embedded buffer due to a short term variation in a data receive rate, the size of the elastic embedded buffer is increased. In addition, a request is sent from the receiving endpoint to the sending endpoint for the sending endpoint to send a burst transfer of data. In a different case, if an overrun of data occurs in the elastic embedded buffer due to a short term variation in a data receive rate, a request is sent from the receiving endpoint to the sending endpoint to resend any data that has overflowed and is not skippable. In yet another case, if the elastic embedded buffer has not incurred an underrun of data for a predetermined period, then the size of the elastic embedded buffer is reduced. The predetermined period may be a number of determinations, or may be an amount of time.

In an additional example embodiment described herein, if data in the buffer reaches a low water mark, then feedback is sent over one or more of the multiple physical interfaces from the receiving endpoint to the sending endpoint instructing the sending endpoint to increase the rate at which the data is streamed. Alternatively, if data in the buffer reaches a high water mark, then feedback is sent over one or more of the multiple physical interfaces from the receiving endpoint to the sending endpoint instructing the sending endpoint to decrease the rate at which the data is streamed.

According to yet an additional example embodiment described herein, the buffer is a DMA (direct memory access) buffer included in hardware of each of the physical interfaces. In this example embodiment, when selecting a buffer size for the buffer, a number of slots in the DMA buffer to be apportioned, and a size of each slot, are selected based at least partially on a data playback rate of the streaming data, and a typical feedback response time for feedback sent from the receiving endpoint to the sending endpoint.

This brief summary has been provided so that the nature of the disclosure may be understood quickly. A more complete understanding can be obtained by reference to the following detailed description and to the attached drawings.

DETAILED DESCRIPTION

Figure 1:
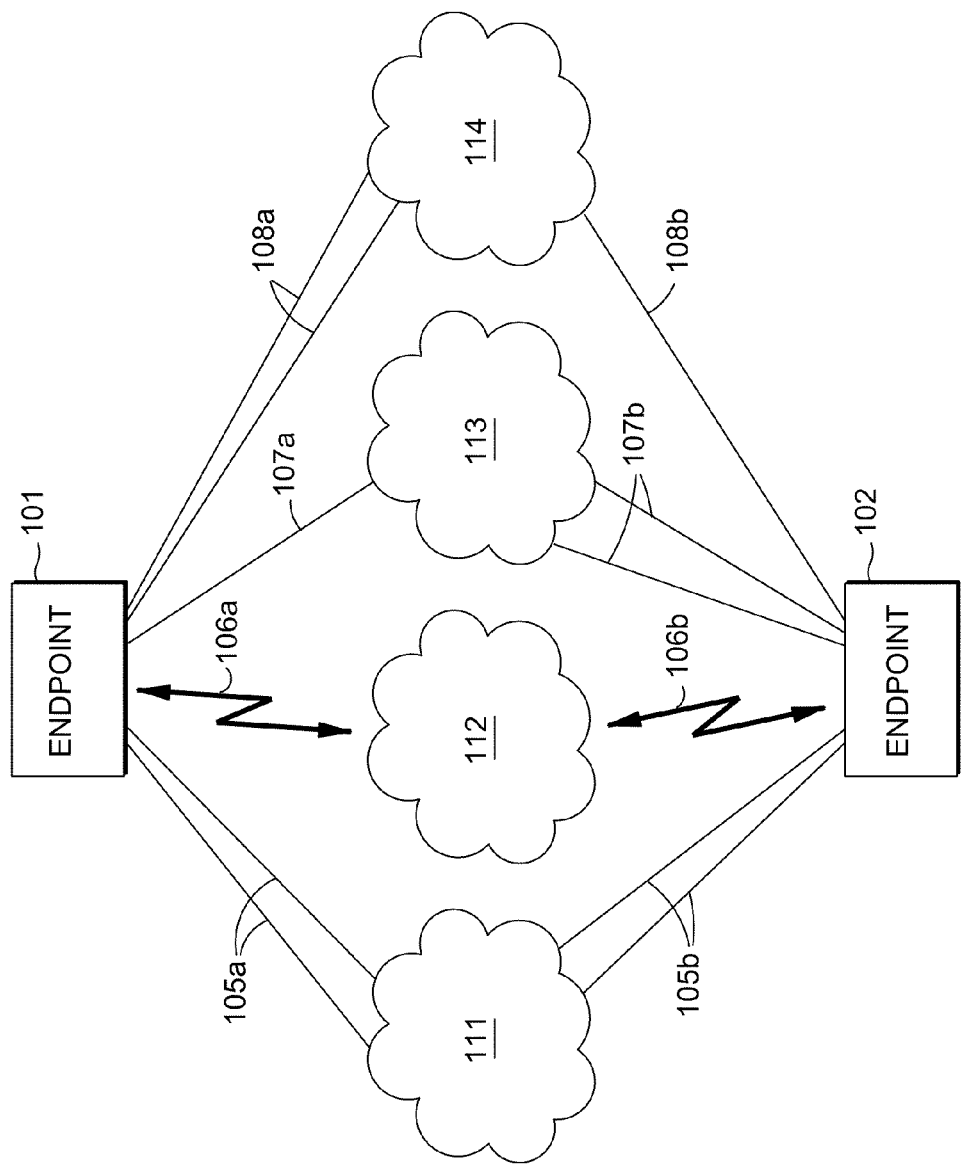
FIG. 1 is a representative view of a sending endpoint and a receiving endpoint, connected via networks, on which an architecture of an example embodiment may be implemented.

FIG. 1 is a representative view of a sending endpoint and a receiving endpoint, connected via one or more networks, on which an architecture of an example embodiment may be implemented. As shown in FIG. 1, sending endpoint 101 is connected to receiving endpoint 102 through networks 111, 112, 113 and 114. The networks may include similar or dissimilar networks, mixed in any combination, as described below. Sending endpoint 101 includes multiple physical interfaces, including at least one or more physical interface for each different network. As shown in the example of FIG. 1, sending endpoint 101 includes physical interfaces 105a, 106a, 107a and 108a. More specifically, sending endpoint 101 has physical interfaces 105a which connect sending endpoint 101 to network 111. In FIG. 1, sending endpoint 101 is shown to have two physical interfaces 105a connecting to network 111; however, in other embodiments, sending endpoint 101 may have a single physical interface connecting to network 111, or may have more than two physical interfaces connecting to network 111.

Receiving endpoint 102 also has multiple physical interfaces 105b connecting to network 111. Similar to sending endpoint 101, receiving endpoint 102 may also have a single or multiple physical interfaces connecting to network 111. As a result of the physical interface connections, sending endpoint 101 is connected to receiving endpoint 102 through network 111, using physical interfaces 105b.

Similar to the above-described connection between sending endpoint 101 and receiving endpoint 102, sending endpoint 101 and receiving endpoint 102 are connected through networks 112, 113 and 114 via physical interfaces 106a and 106b, 107a and 107b and 108a and 108b. Accordingly, sending endpoint 101 is connected to network 112 through one or more physical interfaces 106a; and, receiving endpoint 102 is connected to network 112 through one or more physical interfaces 106b. Sending endpoint 101 is connected to network 113 through one or more physical interfaces 107a; and, receiving endpoint 102 is connected to network 113 through one or more physical interfaces 107b. Lastly, sending endpoint 101 is connected to network 114 through one or more physical interfaces 108a; and, receiving endpoint 102 is connected to network 114 through one or more physical interfaces 108b. In FIG. 1, sending endpoint 101 and receiving endpoint 102 are shown to be connected through four networks; however, sending endpoint 101 and receiving endpoint 102 may be connected through more or less networks. In this regard, the number of networks is established by a user's demands, or is established by an already existing infrastructure connecting the two endpoints.

Networks 111, 112, 113 and 114 can be many different types of networks, such as, for example, an Ethernet network, a Multimedia over Coax Alliance (MoCA) network, a Home-PNA (Home Phoneline Networking Alliance) network, an Ethernet over powerline network (HomePlug), a wireless network, or any other type of network. In addition, the networks connecting the two endpoints can all be a different type of network (e.g., network 111 can be an Ethernet network, while network 112 is a wireless network, network 113 is an Ethernet over powerline network, and network 114 is a MoCA network). On the other hand, the networks connecting the two endpoints can include any variety of combinations of different networks (e.g., network 111 can be a MoCA network, while network 112 is a wireless network, and networks 113 and 114 are Ethernet networks). The type of physical interfaces connecting the endpoints to the networks depends upon the type of network. For example, an endpoint may be connected to an Ethernet network through twisted pair cable, an endpoint may be connected to a MoCA network through coaxial cable, an endpoint may be connected to an Ethernet over powerline network over power lines/wires, and an endpoint may be connected to a wireless network over one or more radio antennas.

The sending endpoint 101 serves as an application sender, which may include, for example, a media server or a conference server. A media server is an endpoint that will transfer audio and video data (or other types of large data) to a client. Although the media server is specific to transferring video streams, other types of media servers can be substituted (e.g., an audio-only stream or a large archival stream). The media server may also be a modified third party application accessing the sending endpoint 101. A conference server is an endpoint that sends data (via Unicast or Multicast) to conference players, and is used in providing interactive conference content to participants.

The receiving endpoint 102 serves as an application receiver, which may include, for example, a media client or media player or a conference player. A media client or media player is an endpoint that receives data from a media server, and is used primarily for video and audio stream playing. A conference player is an endpoint that receives data from the conference server, and is used in playing and interacting within a conference. In some cases, the receiving endpoint 102 may be an embedded system. For example, the receiving endpoint 102 may be a set top box or a smart TV.

In some instances, a sending endpoint may also simultaneously act as a receiving endpoint. For example, when a sending endpoint serves as a video conferencing application, video would stream from the sending endpoint to the receiving endpoint, and video would stream simultaneously from the receiving endpoint to the sending endpoint. In this example, the sending endpoint would also be acting as a receiving endpoint, and the receiving endpoint would also be acting as a sending endpoint. In other instances, a sending endpoint may become a receiving endpoint after some period of time. For example, a sending endpoint and a receiving endpoint might transfer data back and forth to each other in a ping-pong fashion, rather than simultaneously. In other words, the sending endpoint might complete a transfer of data to the receiving endpoint, and then a second transfer may begin in the opposite direction from the receiving endpoint to the sending endpoint.

Figure 2:
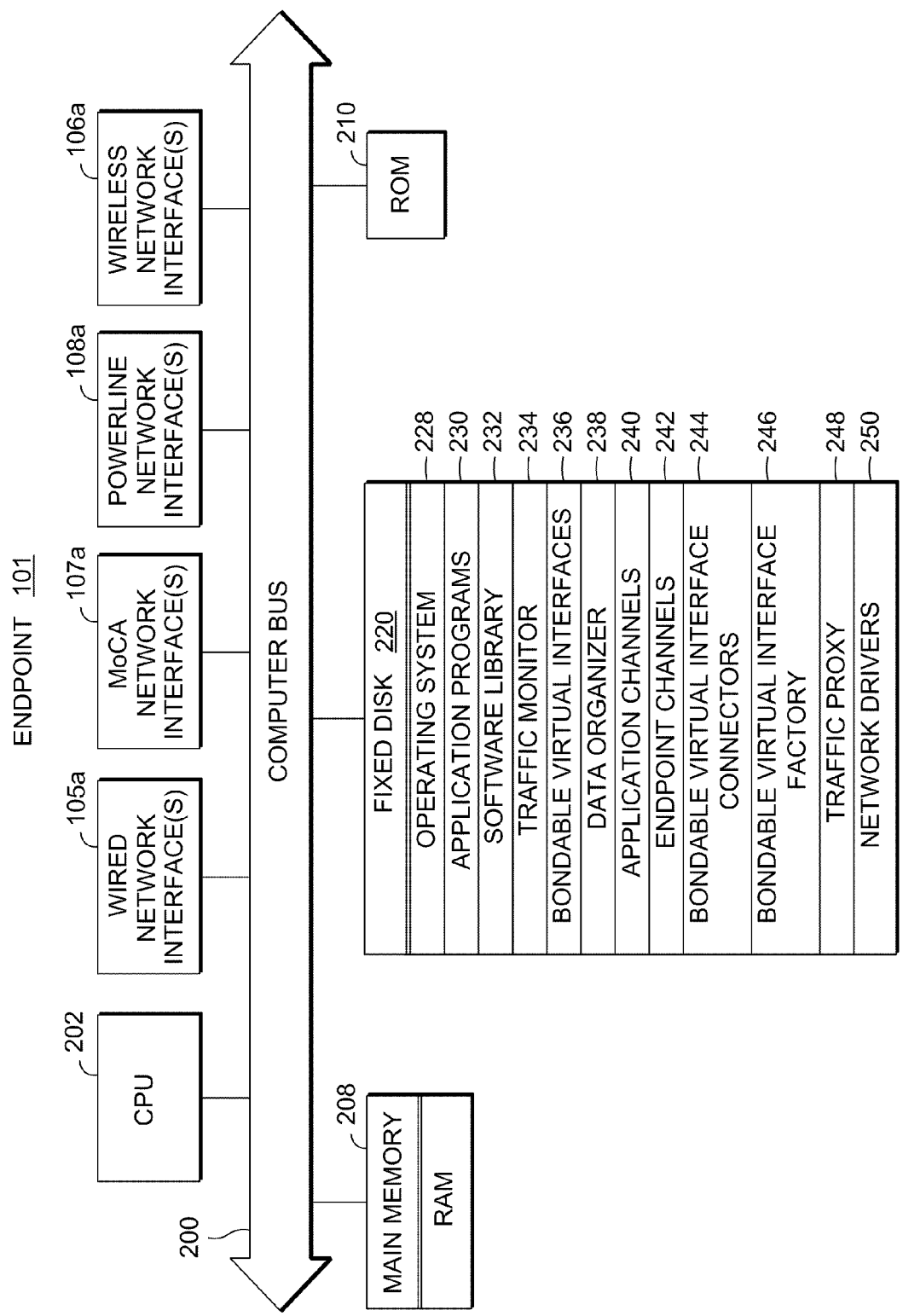
FIG. 2 is a detailed block diagram for explaining the internal architecture of the sending endpoint of FIG. 1.

FIG. 2 is a detailed block diagram for explaining the internal architecture of the sending endpoint 101 of FIG. 1. As shown in FIG. 2, sending endpoint 101 includes central processing unit (CPU) 202 which interfaces with computer bus 200. Also interfacing with computer bus 200 are hard (or fixed) disk 220, wired network interface(s) 105a, wireless network interface(s) 106a, MoCA network interface(s) 107a, powerline network interface(s) 108a, random access memory (RAM) 208 for use as a main run-time transient memory, and read only memory (ROM) 210.

RAM 208 interfaces with computer bus 200 so as to provide information stored in RAM 208 to CPU 202 during execution of the instructions in software programs such as an operating system, application programs, and interface drivers. More specifically, CPU 202 first loads computer-executable process steps from fixed disk 220, or another storage device into a region of RAM 208. CPU 202 can then execute the stored process steps from RAM 208 in order to execute the loaded computer-executable process steps. In addition, data such as gathered network performance statistics or other information can be stored in RAM 208, so that the data can be accessed by CPU 202 during the execution of computer-executable software programs, to the extent that such software programs have a need to access and/or modify the data.

As also shown in FIG. 2, hard disk 220 contains operating system 228, application programs 230 such as programs for starting up and shutting down the sending endpoint 101 or other programs. Hard disk 220 further contains software library 232 for controlling the sending of data from sending endpoint 101. Hard disk 220 also contains traffic monitor 234 for gathering performance statistics for each of the multiple physical interfaces 105a, 106a, 107a and 108a. In addition, hard disk 220 contains bondable virtual interfaces 236, data organizer 238, application channels 240, endpoint channels 242, bondable virtual interface connectors 244, bondable virtual interface factory 246, and traffic proxy 248, each of which is instantiated by the software library 232 and will be described in more detail below with reference to FIGS. 4 and 5. Traffic proxy 248 may be used as a communication interface between the software library 232 and the traffic monitor 234. Lastly, hard disk 220 contains network drivers 250 for software interface to networks such as networks 111, 112, 113 and 114.

In an example embodiment, software library 232 and traffic monitor 234 are loaded by CPU 202 into a region of RAM 208. CPU 202 then executes the stored software library 232 and the traffic monitor 234 from RAM 208 in order to execute the loaded computer-executable steps. In addition, application programs 230 are loaded by CPU 202 into a region of RAM 208. CPU 202 then executes the stored process steps as described in detail below in connection with FIG. 13, in order to execute the loaded computer-executable steps.

Figure 3A:
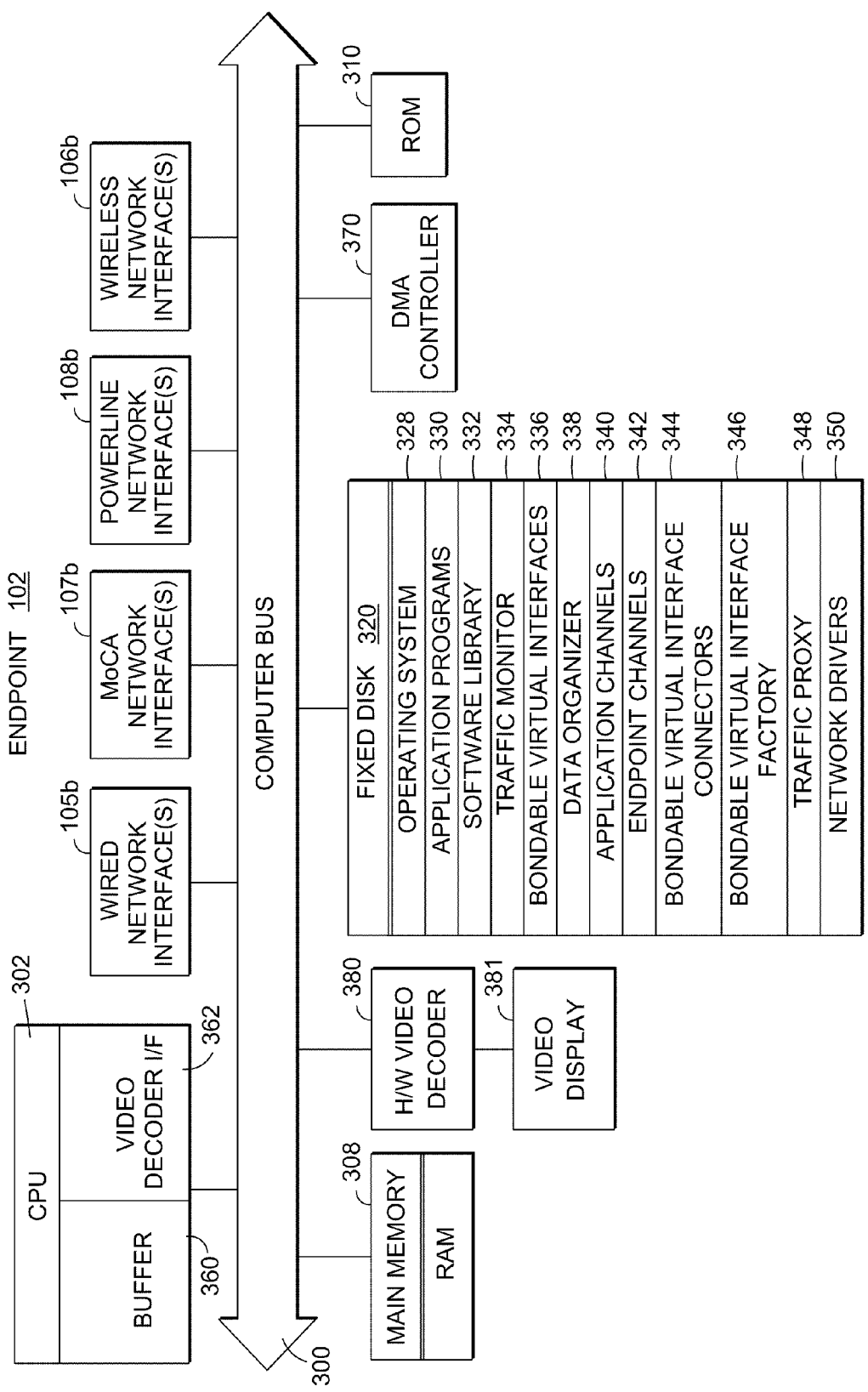
FIG. 3A is a detailed block diagram for explaining the internal architecture of the receiving endpoint of FIG. 1 according to an example embodiment.

FIG. 3A is a detailed block diagram for explaining the internal architecture of the receiving endpoint 102 of FIG. 1 according to an example embodiment. As shown in FIG. 3A, receiving endpoint 102 includes central processing unit (CPU) 302 which interfaces with computer bus 300. CPU 302 includes a buffer 360 and a video decoder interface 362. Also interfacing with computer bus 300 are hard (or fixed) disk 320, wired network interface(s) 105b, wireless network interface(s) 106b, MoCA network interface(s) 107b, powerline network interface(s) 108b, random access memory (RAM) 308 for use as a main run-time transient memory, read only memory (ROM) 310, direct memory access (DMA) controller 370, and an H/W video decoder 380 coupled to a video display 381.

RAM 308 interfaces with computer bus 300 so as to provide information stored in RAM 308 to CPU 302 during execution of the instructions in software programs such as an operating system, application programs, and interface drivers. More specifically, CPU 302 first loads computer-executable process steps from fixed disk 320, or another storage device into a region of RAM 308. CPU 302 can then execute the stored process steps from RAM 308 in order to execute the loaded computer-executable process steps. In addition, data such as gathered network performance statistics or other information can be stored in RAM 308, so that the data can be accessed by CPU 302 during the execution of computer-executable software programs, to the extent that such software programs have a need to access and/or modify the data.

As also shown in FIG. 3A, hard disk 320 contains operating system 328, application programs 330 such as programs for starting up and shutting down the receiving endpoint 102 or other programs. Hard disk 320 further contains software library 332 for controlling the receiving of data from receiving endpoint 102.

Software library 332 in this example is identical to software library 232 in sending endpoint 101. However, in other embodiments, the software library 332 need not be identical to library 232, so long as the two libraries implement a similar software architecture relative to the software library, the traffic monitor, the bondable virtual interfaces, and the data organizer. For example, the sending and receiving endpoints might implement different versions of the same software architecture. Or the sending and receiving endpoints might implement architecture that target different operating systems, such as Windows on the sending endpoint and Linux on the receiving endpoint. Or, the sending endpoint and the receiving endpoint might implement architecture that is OS-neutral like JAVA. Hard disk 320 also contains traffic monitor 334 for gathering performance statistics for each of the multiple physical interfaces 105b, 106b, 107b and 108b. In addition, hard disk 320 contains bondable virtual interfaces 336, data organizer 338, application channels 340, endpoint channels 342, bondable virtual interface connectors 344, bondable virtual interface factory 346, and traffic proxy 348, each of which is instantiated by the software library 332 and will be described in more detail below with reference to FIGS. 4 and 5. Traffic proxy 348 may be used as a communication interface between the software library 332 and the traffic monitor 334. Lastly, hard disk 320 contains network drivers 350 for software interface to networks such as networks 111, 112, 113 and 114.

CPU 302 receives data from the interfaces 105b to 108b over computer bus 300. CPU 302 then stores the data in the buffer 360. CPU 302 then transfers the data from the buffer 360 to the video decoder I/F 362. The data is sent over the computer bus 300 to the H/W video decoder 380, and displayed as a video on the video display 381.

In an example embodiment, software library 332 and traffic monitor 334 are loaded by CPU 302 into a region of RAM 308. CPU 302 then executes the stored process steps of the software library 332 and the traffic monitor 334 from RAM 308 in order to execute the loaded computer-executable steps. In addition, the process steps of the application programs 330 are loaded by CPU 302 into a region of RAM 308. CPU 302 then executes the stored process steps as described in detail below in connection with FIG. 13, in order to execute the loaded computer-executable steps.

Figure 3B:
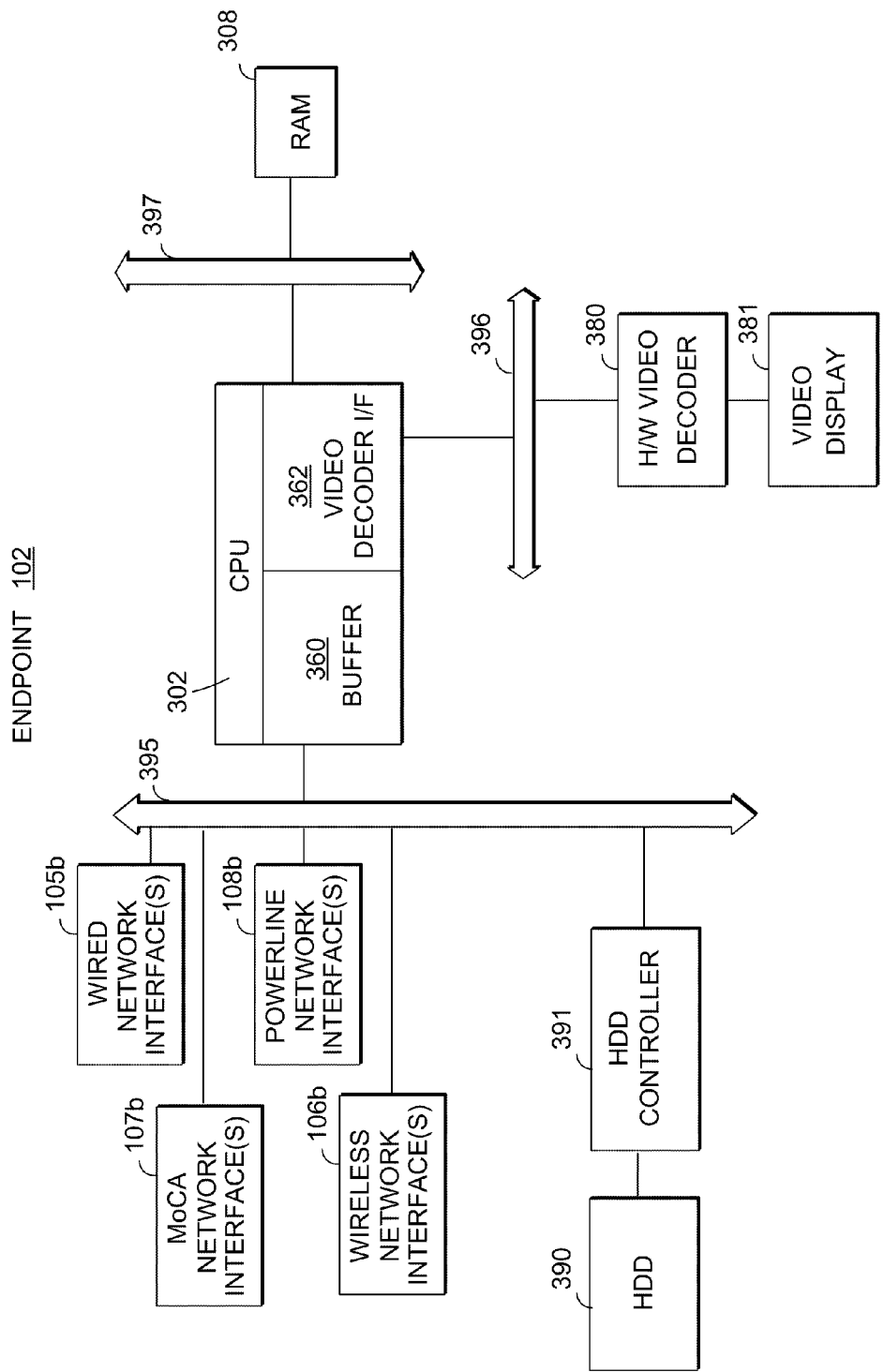
FIG. 3B is a detailed block diagram for explaining the internal architecture of the receiving endpoint of FIG. 1, particularly for an embedded system according to an example embodiment.

FIG. 3B is a detailed block diagram for explaining the internal architecture of the receiving endpoint of FIG. 1, particularly for an embedded system according to another example embodiment. As shown in FIG. 3B, the receiving endpoint 102 includes CPU 302 which interfaces with system bus 395, PCI bus 396, and memory bus 397. CPU 302 includes a buffer 360 and a video decoder interface 362. Also interfacing with system bus 395 are wired network interface(s) 105b, wireless network interface(s) 106b, MoCA network interface(s) 107b, powerline network interface(s) 108b, hard disk drive (HDD) controller 391 and HDD 390. Also interfacing with PCI bus 396 are H/W video decoder 380 and video display 381. Also interfacing with memory bus 397 is RAM 308.

In FIG. 3B, data is received by the multiple interfaces 105b to 108b by CPU 302 over the system bus 395. CPU 302 then stores the data received from the multiple physical interfaces 105b to 108b in the buffer 360. CPU 302 then transfers the data from the buffer 360 to the video decoder I/F 362. The data is then sent over the PCI bus 396 to the H/W video decoder 380, and displayed as a video on the video display 381.

In an example embodiment, process steps for performing the process described in detail below in connection with FIG. 13 may be stored in, for example, HDD 390. CPU 302 loads the stored process steps into a region of RAM 308, and then executes the stored process steps, in order to execute the loaded computer-executable steps.

General Description of Architecture

Transferring data between two endpoints in an efficient manner is difficult. Efficiency can be improved in general by increasing the amount of information concerning the nature of the transfer. For example, efficiency can be improved with an understanding of how to send data between two endpoints and also an understanding of the type of data being sent. Further, by identifying multiple physical interfaces and combining them together into one physical interface (i.e., bondable virtual interface), data throughput may be improved.

In a simplistic architecture, a media receiver/player requests (via e.g., HTTP or RTSP) for a movie stream from a media server. The media server then sends data to the client with some, but probably little concern as to the means or how well the client may have received the media stream data. In contrast, within the architecture of this example embodiment, the media client provides profile information (i.e., a suggested or predetermined bondable virtual interface configuration) as to the type of the media to be streamed, and negotiates with the media server as to the physical interfaces available to exchange data. With this knowledge of media type, both the sending and receiving buffer can be modified to improve throughput. The negotiation between the media client and the media server produces a configuration and setup for multiple physical interfaces via negotiation. In a case where there are multiple logical physical interfaces, the creation of a combined (or bondable virtual interface) physical interface will occur. In this regard, a bondable virtual interface is a combination of physical interfaces that can send data via multiple physical interfaces. Further, feedback information will be sent between both endpoints to improve throughput. The media client then receives the segments on the multiple physical interfaces, recombines the segments and provides the data to the media client's player (whether included in the media client or connected to the media client). Using this architecture makes it possible to ordinarily improve throughput by: (1) Sending information back to the endpoint regarding changes to the data stream or processing of the data, which improves the efficiency of buffer management, and (2) using a bondable virtual interface which increases throughput of data by using multiple physical interfaces to send the data.

Figure 4:
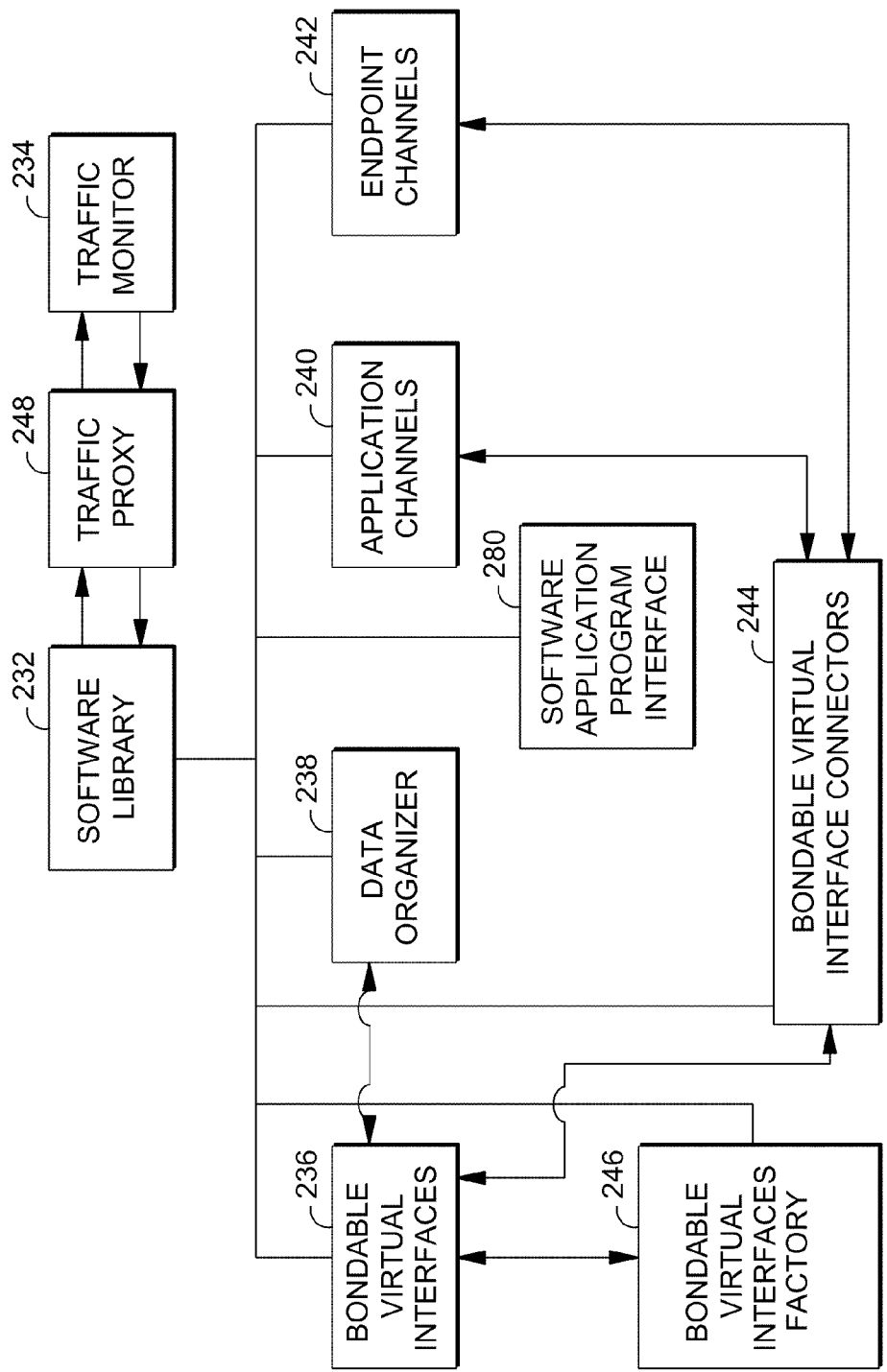
FIG. 4 is a high level view of an architecture according to an example embodiment.

FIG. 4 is a high level view of an architecture according to an example embodiment. As shown in FIG. 4, the architecture includes software library 232 and traffic monitor 234. The software library 232 is connected to and communicates with the traffic monitor 234 through traffic proxy 248. In this regard, the software library 232 instantiates and associates with the traffic monitor 234 via the traffic proxy 248. However, the traffic proxy 248 may be omitted, and the software library 232 and the traffic monitor 234 may communicate with each other directly.

As used herein, the word "instantiate" refers to the construction in memory of a software object, such as by use of an object factory. How the software object is created varies among different programming languages. In prototype-based languages, an object can be created from nothing, or an object can be based on an existing object. In class-based language, objects are derived from classes, which can be thought of as blueprints for constructing the software objects.

As further shown in FIG. 4, the software library 232 is connected to bondable virtual interfaces 236, bondable virtual interface factory 246, data organizer 238, software application program interface 280, application channels 240, and endpoint channels 242. In this regard, the software library 232 instantiates and associates with the bondable virtual interfaces 236, the bondable virtual interface factory 246, the data organizer 238, the software application program interface 280, the application channels 240, and the endpoint channels 242. In addition, the data organizer 238 instantiates a data splitter or a data combiner (both of which are described below in detail in connection with FIG. 5), depending on whether the architecture is implemented on a sending endpoint or a receiving endpoint. The foregoing mentioned components will be described, including their use and functionality, in more detail below in connection with FIG. 5.

Furthermore, the bondable virtual interface factory 246 is connected to and associates with the bondable virtual interfaces 236. The bondable virtual interfaces 236 are also connected to and associate with the data organizer 238 and the bondable virtual interface connectors 244. The bondable virtual interface connectors 244 also associate with application channels 240 and endpoint channels 242.

Figure 5:
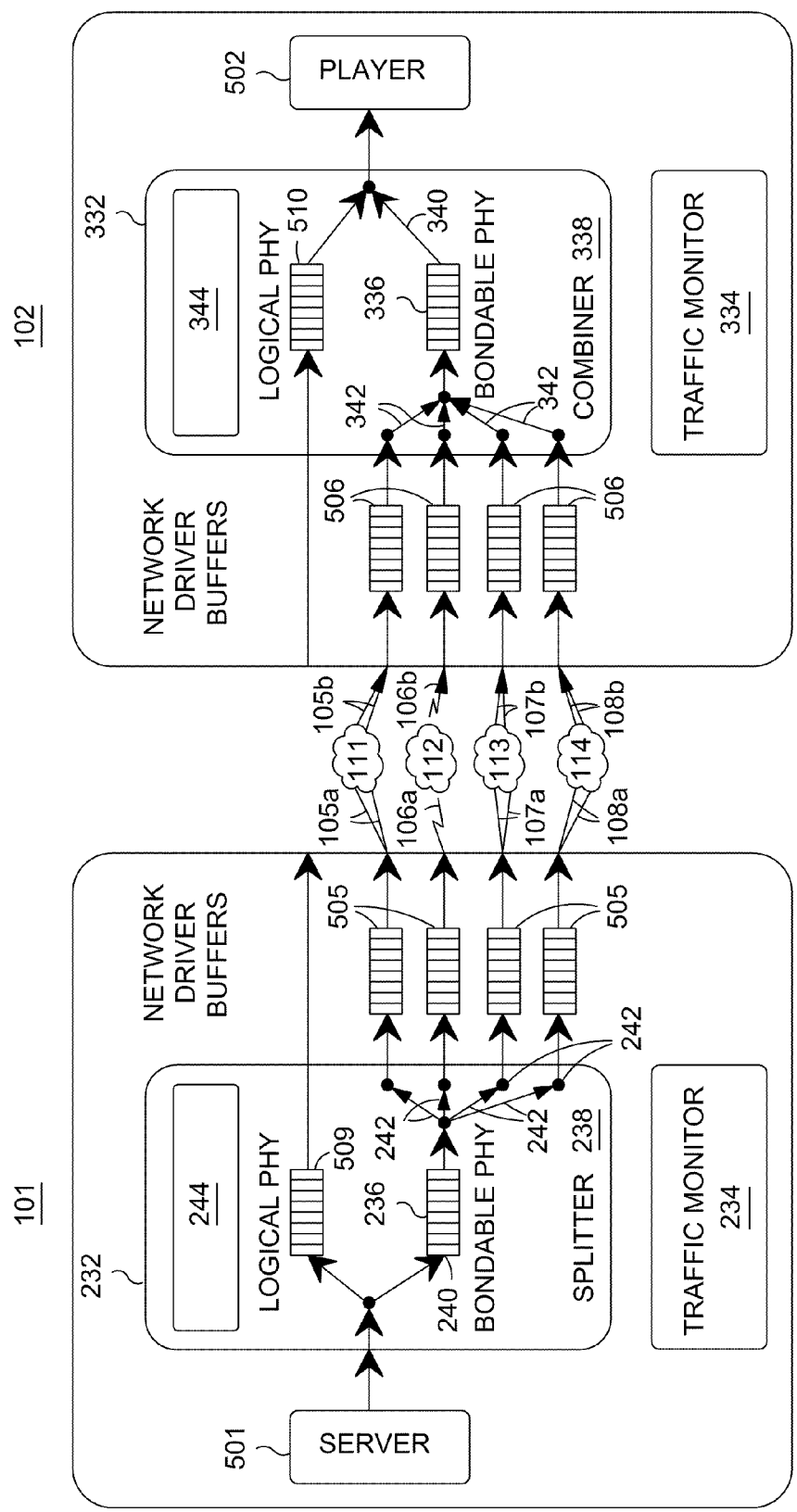
FIG. 5 is another view of a sending endpoint and a receiving endpoint, for providing a general explanation of an example embodiment.

The above-mentioned architecture will now be described in more detail in connection with FIG. 5. FIG. 5 is another view of the sending endpoint 101 and the receiving endpoint 102 shown in FIG. 1, for providing an explanation of an example embodiment of the architecture included in both endpoints. As discussed above in connection with FIG. 1, the architecture is for streaming data from a sending endpoint 101 to a receiving endpoint 102 which are connected to each other by one or more networks (111, 112, 113, 114 of FIG. 1). Each of the sending endpoint 101 and the receiving endpoint 102 has multiple physical interfaces (105a and b, 106a and b, 107a and b and 108a and b of FIG. 1), each for interfacing to a respective one of the one or more networks. The architecture for controlling the streaming of the data is implemented on both the sending endpoint 101 and the receiving endpoint 102.

As shown in FIG. 5, the architecture on the sending endpoint 101 includes a software library 232 and a traffic monitor 234. The traffic monitor 234 is for gathering performance characteristics of each of the multiple physical interfaces. More specifically, the traffic monitor 234 is an operating system-specific application or (daemon) service that provides the software library 232 with all of the available physical interfaces, and with individual physical interface performance/traffic statistics and data. The traffic monitor 234 may obtain network status by periodically making system calls to system's data structures to acquire statistics for each physical interface of the sending endpoint 101. This data is then used by the traffic monitor 234 to specify corresponding configurations for bondable virtual interfaces, which will be described in more detail below, including a list of suitable known bondable virtual interfaces that can be used to transfer data based on current network traffic. The traffic monitor 234 communicates information back and forth between the software library 232. As shown in FIG. 5, the traffic monitor 234 communicates directly with the software library 232; however, in other embodiments, the traffic monitor 234 can communicate with the software library 232 via traffic proxy 248 as described above in connection with FIG. 4.

The software library 232 is for controlling the sending of the data stream from the sending endpoint 101. In controlling the sending of data, the software library 232 instantiates a plurality of bondable virtual interfaces 236 and a data organizer 238. In addition, the software library 232 instantiates logical physical interfaces 509. The logical physical interface 509 is an abstraction of a physical interface, which has a uniform interface. In addition, the bondable virtual interfaces 236 are instantiated by the software library based on the information communicated by the traffic monitor 234, for splitting the data stream into multiple data substreams at the sending endpoint 101. A bondable virtual interface is a clustering of two or more logical physical interfaces as a bondable object that aggregates available bandwidth with a single thread to manage a common buffer memory. The bondable virtual interface has a second thread to listen to a single feedback path from the receiving endpoint 102, and has additional threads for managing data transfer from a common buffer memory to each of an associated logical physical interface. An example of a bondable virtual interface is a pair of 802.11g wireless interfaces combined for a nominal available bandwidth of 44 Mb/s, assuming ~22 Mb/s of effective bandwidth for each individual interface.

In addition, the data organizer is used for designating one of the plurality of bondable virtual interfaces 236 for splitting the data stream. At the sending endpoint 101, the data organizer 238 instantiates a data splitter 238 for implementing the designated one of the plurality of bondable virtual interfaces 236 at the sending endpoint 101. In this regard, the data organizer 238 is a parent object for the data splitter, and includes functionality for the registration of new or added bondable virtual interfaces. Moreover, the data organizer 238 is inherited by the data splitter 238. The data splitter 238 contains the bondable virtual interfaces 236 class implementation, and contains the associated behavior for splitting the input data stream onto the multiple physical interfaces.

Similar to the sending endpoint 101, in the receiving endpoint 102, the architecture includes a software library 332 and a traffic monitor 334. The traffic monitor 334 is for gathering performance characteristics of each of the multiple physical interfaces. More specifically, the traffic monitor 334 is an operating system-specific application or (daemon) service that provides the software library 332 with all of the available physical interfaces and with individual physical interface performance/traffic statistics and data. The traffic monitor 334 may obtain network status by periodically making system calls to system's data structures to acquire statistics for each physical interface of the receiving endpoint 102. This data is then used by the traffic monitor 334 to specify corresponding configurations for bondable virtual interfaces, which will be described in more detail below, including a list of suitable known bondable virtual interfaces that can be used to transfer data based on current network traffic. The traffic monitor 334 communicates information back and forth between the software library 332. In FIG. 5, the traffic monitor 334 communicates directly with the software library 332; however, in other embodiments, the traffic monitor 334 can communicate with the software library 332 via a traffic proxy as described above in connection with FIG. 4.

The software library 332 is for controlling the receiving of the data stream at the receiving endpoint 102. In controlling the receiving of data, the software library 332 instantiates a plurality of bondable virtual interfaces 336 and a data organizer 338. In addition, the software library 332 instantiates logical physical interfaces 510. The logical physical interfaces 510 are substantially the same as logical physical interfaces 509, and provide the same functions. The bondable virtual interfaces 336 are instantiated by the software library based on the information communicated by the traffic monitor 334, for combining the multiple data sub-streams into the data stream at the receiving endpoint 102. In addition, the data organizer is for designating one of the plurality of bondable virtual interfaces 236 for combining the data stream.

At the receiving endpoint 102, the data organizer 338 instantiates a data combiner 338 for implementing the designated one of the plurality of bondable virtual interfaces 336 at the receiving endpoint 102. In this regard, the data combiner 338 is a parent object for the data combiner 338, and includes functionality for the registration of new or added bondable virtual interfaces. Moreover, the data organizer 338 is inherited by the data combiner 338. The data combiner 338 contains the bondable virtual interfaces 336 class implementation, and contains the associated behavior for combining multiple input streams into a resulting single data stream.

At startup of the architecture, the data splitter 238 and the data combiner 338 read network statistics provided by the traffic monitor 234 and 334. The traffic monitors' network statistics are updated periodically (at optionally application specified intervals), and are organized to display an ordered list of recommended bondable physical interface configurations, along with a minimum bandwidth available for each.

As further shown in FIG. 5, the sending endpoint 101 and the receiving endpoint 102 are each connected to one or more applications, such as application server 501 and application player 502, respectively. In this regard, the software library 232 of the sending endpoint 101 and the software library 332 of the receiving endpoint 102 further instantiate one or more application channels 240 and 340, respectively, connecting the software libraries 232 and 332 to one or more applications 501 and 502, respectively. The one or more application channels 240 write data to the software library 232, the written data having been received by the sending endpoint 101 from the one or more applications 501. In addition, the one or more application channels 340 read data from the software library 332, the read data having been sent from the receiving endpoint 102 to the one or more applications 502 connected to the receiving endpoint 102. For the application channels, a "named-socket" can be used, which provides a very similar interface to the traditional "single socket" approach in common usage. Moreover, the one or more application channels 240 and 340 include an event handling mechanism to indicate when there is data to be read from or written to the software libraries 232 and 332. The event handling mechanism for a named-socket is a select; however, many other means can be used for triggering events on the application channels.

As shown in FIG. 5, the software libraries 232 and 332 further instantiate multiple endpoint channels 242 and 342, respectively, connecting the software libraries 232 and 332 to the multiple physical interfaces 105a to 108a and 105b to 108b through network driver buffers 505 and 506. The multiple endpoint channels 242 and 342 write data to the software library 332, the written data having been received at the receiving endpoint 102 from the sending endpoint 101, and read data from the software library 232, the read data having been sent from the sending endpoint 101 to the receiving endpoint 102. The multiple endpoint channels 242 and 342 include an event handling mechanism to indicate when there is data to be read from or written to the multiple physical interfaces 105a and 105b to 108a and 108b. In addition, the network driver buffers 505 and 506 are provided to store data before sending data on the sending side, and before reconstructing the data stream and providing the single data stream to the application player 502 on the receiving side. In general, for the multiple endpoint channels, UDP and/or TCP sockets are used to write and read data to/from a network. Moreover, the event handling mechanism for the endpoint channels can be a select; however, other means for triggering events on the endpoint channels may be used. Lastly, an endpoint channel usually has an associated physical interface (e.g., an Ethernet socket); however, other instances exist in which this is not the case. For example, the case exists of using one physical interface but using multiple ports (e.g., using 2 sockets using IP address 192.168.10.1 port 10000 and port 10001).

The bondable virtual interfaces 236 and 336, as shown in FIG. 5, are created by the data splitter 238 or the data combiner 338 to perform the splitting or combining of the data stream. The bondable virtual interfaces 236 and 336 conform to an interface, which allows them to be used generically in the framework. In other words, one bondable virtual interface could be substituted with another bondable virtual interface quite easily without changing any interface requirements elsewhere in the software library, or in an application. Lastly, a bondable virtual interface can have multiple physical interfaces associated with it, or a bondable virtual interface can have a single logical physical interface (as is the case with sockets using one physical interface but with multiple ports).

In addition, the bondable virtual interfaces 236 and 336 have the basic functionality to split or combine data (based upon the role provided by the data splitter 238 or the data combiner 338). In general, the bondable virtual interfaces may be a reduction of a number or a set of rules regarding how to handle data from one or more application channels split over one or more endpoint channels (or vice versa, when recombining data). Thus, different types of bondable virtual interfaces may be created. Three examples of such bondable virtual interfaces are: a simple TCP Bondable virtual interface, a simple UDP bondable virtual interface, and a feedback TCP bondable virtual interface. A simple TCP bondable virtual interface is a bondable virtual interface consisting of multiple physical network interfaces, sending data with each interface using standard TCP connections. An example of a simple TCP bondable virtual interface would be a "round robin" type bondable virtual interface, which uses multiple interfaces to send data.

A simple UDP bondable virtual interface is a bondable virtual interface consisting of multiple physical network interfaces, and sending data with each interface using standard UDP datagrams.

A feedback TCP bondable virtual interface is a bondable virtual interface which utilizes feedback from the receiving endpoint to change the manner in which data is sent over multiple physical network interfaces using TCP connections.

When designating ones of the plurality of bondable virtual interfaces 236 and 336, the data splitter 238 and the data combiner 338 negotiate to designate one of the bondable virtual interfaces, based on the performance characteristics of the multiple physical interfaces 105a to 108a and 105b to 108b and available ones of the plurality of bondable virtual interfaces. During the negotiation between the data splitter 238 and the data combiner 338, the data splitter 238 presents available ones of the plurality of bondable virtual interfaces, and the data combiner 338 selects one of the available ones of the plurality of bondable virtual interfaces.

Furthermore, the software libraries 232 and 332 further instantiate a plurality of bondable virtual interface connectors 244 and 344, respectively. Each bondable virtual interface connector is associated with a specific bondable virtual interface. The bondable virtual interface connectors 244 and 344 ensure that the connections between the software libraries 232 and 332 and the multiple physical interfaces 105a to 108a and 105b to 108b via the multiple endpoint channels 242 and 342, respectively, are ready to accept data before sending data from the sending endpoint 101 to the receiving endpoint 102. In addition, the bondable virtual interface connectors 244 and 344 ensure that the connections between the software libraries 232 and 332 and the one or more applications 501 and 502 via the one or more application channels 240 and 340, respectively, are ready to accept data before sending data from the sending endpoint 101 to the receiving endpoint 102.

When sending streaming data from the sending endpoint 101 to the receiving endpoint 102, the one or more applications 501 specify a category of time objective: the categories include a non-time critical objective, a time critical objective, or a near-time critical objective. A non-time critical data stream is a data stream where the data should be received without error; however, time may not be a critical factor (i.e., there may be scenarios (or situations) where time is a critical factor). In these scenarios, a contributing factor for a non-time critical data stream should also include data integrity and thus, in these situations, there is a significant difference between non-time critical, near-time critical and time critical. For example, a non-time critical objective would be specified for a simple file transfer, because the data in this scenario ordinarily should be received without error, and arrival time may not be important for this data.

A near-time critical data stream is a data stream where the data is bound to an endpoint within a range of time. For example, a video stream is a near-time critical data stream because the video stream can be buffered for a certain amount of time before the data is to be displayed.

For a time-critical data stream, it is usually imperative that the information be received as quickly as possible. Moreover, a time critical objective would be specified when streaming an interactive video stream such as a video conference, because the data in this scenario should be received as soon as possible, while a loss of an insignificant portion of the data may be acceptable.

Because a time objective is specified for the data to be sent, the architecture has greater flexibility in choosing which of the multiple physical interfaces to utilize in sending data. Thus, instead of solely relying on network bandwidth of the multiple physical interfaces, the architecture can utilize the time objectives to provide an even more efficient means of sending data between the endpoints.

For the near-time critical and the time critical data streams, transferring of the stream will involve a payload stream mechanism, a feedback mechanism, and a control stream mechanism. The payload stream mechanism sends the payload content from the sending endpoint 101 to the receiving endpoint 102. In the architecture, the payload stream is sent via a bondable virtual interface, for example, using an RTP-like protocol where multiple physical interfaces will be used to send data to the receiving endpoint 102. The control stream mechanism sends content control commands from the receiving endpoint 102 to the sending endpoint 101 (e.g., play, pause, etc.) using, for example, an RTSP like protocol.

The feedback mechanism is used to send feedback information from the receiving endpoint 102 to the sending endpoint 101. In general, feedback information, including instructions for the sending endpoint 101, which will be described in more detail below in connection with FIG. 13, is sent from the receiving endpoint 102 to the sending endpoint 101. The feedback information may be sent over one of the physical interfaces, or the feedback information may be split and sent over more than one of the physical interfaces. The feedback information is then used by the sending endpoint 101 to enable the sending endpoint 101 to change how it splits and sends data over multiple physical interfaces, which will be discussed in more detail below in connection with FIG. 13. A more detailed description of providing and using feedback information is provided in U.S. application Ser. No. 12/732, 167, titled "Providing Feedback Information When Network Streaming Over Multiple Physical Interfaces", by Martin Martinez, et al., filed Mar. 25, 2010, and U.S. application Ser. No. 12/732,169, titled "Network Streaming Over Multiple Physical Interfaces Using Feedback Information", by Martin Martinez, et al., filed Mar. 25, 2010, the content of each of which is incorporated by reference herein.

For a non-time critical data stream, the transferring of the stream within the architecture will have the same behavior as the near-time and the time critical data streams with no control stream. Thus, the transferring of the stream for a non-time critical data stream involves a payload stream mechanism and a feedback mechanism, each having similar characteristics as the stream mechanisms of the near-time and the time critical data streams.

Furthermore, the software libraries 232 and 332 each further comprise a software application program interface 280, as described in connection with FIG. 4, which consists of a set of commands used by the one or more applications 501 and 502 to utilize the architecture. In addition, the software libraries 232 and 332 each instantiate a bondable virtual interface factory 246, as described in connection with FIG. 4, for registering the newly created ones of the plurality of bondable virtual interfaces, unregistering ones of the plurality of bondable virtual interfaces which are no longer available, and providing a list of available bondable virtual interfaces to the data organizer.

As discussed above, the traffic monitors 234 and 334 may communicate with the software libraries 232 and 332, respectively, via a traffic proxy. In this case, the software libraries 234 and 334 each further instantiate a traffic proxy 248 (as described in connection with FIGS. 2 and 4) and a traffic proxy 348 (as described in connection with FIG. 3) for communicating information between the traffic monitors 234 and 334 and the software libraries 232 and 332, respectively, via a shared common interface. The common interface is a shared library, which contains objects containing information and the means to share this common data between the traffic monitors 232 and 332 and the traffic proxies 248 and 348. The transport mechanism can be changed easily and additional information can be added (e.g., by adding new objects). Furthermore, in cases where the bondable virtual interface uses some form of feedback mechanism, traffic problems identified by feedback will be relayed to the traffic monitors 234 and 334 via the traffic proxies 248 and 348.

In general, all interaction between the architecture and other applications is conducted through a basic interface. This basic interface is comprised of a core functionality, which is specific to the architecture, and behavioral functionality, which is specific to the operation of the interfacing application. Examples of core functionality would be a startup and shutdown of the architecture. Behavioral functionality examples might include RTSP, or URL connection functionality. For example, the architecture will provide a setup functionality to extend the standard RTSP setup functionality, in which the extension to RTSP is obtainable from an RTSP OPTIONS command. In another example, URL connection functionality can be added to achieve file transfer behavior.

Use Cases

Some example implementations are described below, which use the architecture according to an example embodiment. These use cases include situations in which the architecture will be used, and the steps to be implemented for these situations. The following use cases are not an extensive list of use cases for all scenarios of using the architecture; rather, other use cases and implementations may exist or be developed.

Video Streaming Use Case

Figure 6:
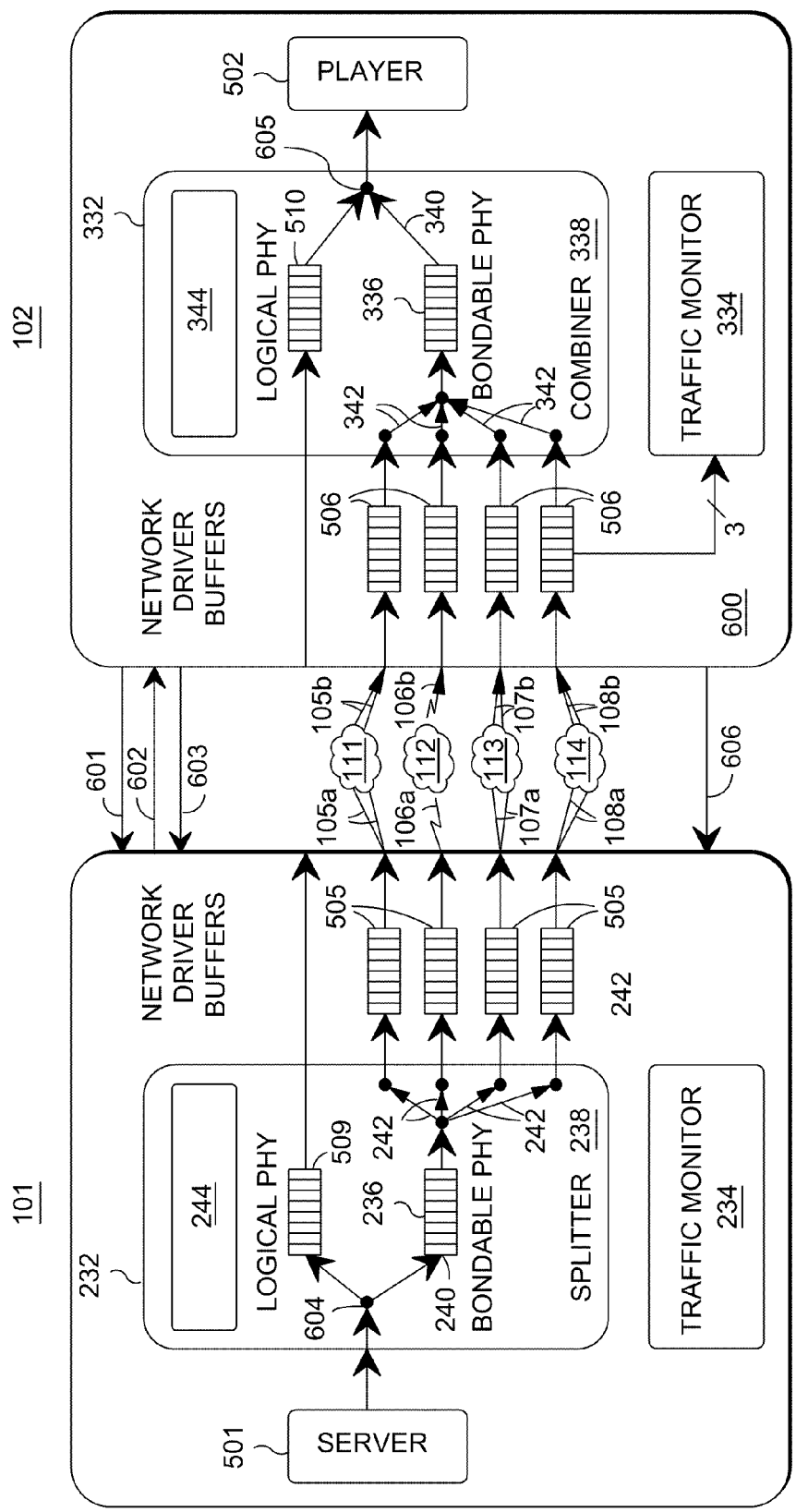
FIG. 6 is an illustration for providing an explanation of a sending endpoint and a receiving endpoint negotiating a playback of a media stream in accordance with an example embodiment.

FIG. 6 is an illustration for providing an explanation of a sending endpoint and a receiving endpoint negotiating a playback of a media stream. In particular, FIG. 6 shows how the sending endpoint 101 and the receiving endpoint 102 of FIG. 1 negotiate a playback of a media stream over multiple interfaces 105*a* and 105*b* to 108*a* to 108*b* connecting the sending endpoint 101 and the receiving endpoint 102 to one or more networks 111 to 114 using a session initiation and control protocol such as RTSP. FIGS. 6 to 13 describe this behavior of the sending endpoint 101 and the receiving endpoint 102, using UML sequence diagrams. FIG. 6 describes the behavior at a top level in order to better understand the behavior from an overall system viewpoint. Each of the sending endpoint and the receiving endpoint has multiple physical interfaces (105*a* and *b*, 106*a* and *b*, 107*a* and *b* and 108*a* and *b* of FIG. 1), each for interfacing to a respective one of the one or more networks. The architecture for controlling the streaming of data is implemented on both the sending endpoint 101 and the receiving endpoint 102.

As shown in FIG. 6, each of sending endpoint 101 and receiving endpoint 102 are connected to multiple physical interfaces 105*a* to 108*a* and 105*b* to 108*b*, respectively, which connect the endpoints through one or more networks 111 to 114, as similarly shown in FIG. 5. Also similar to the structure in FIG. 5, each of the sending endpoint 101 and the receiving endpoint 102 includes an architecture for controlling the streaming of data over the multiple physical interfaces 105*a* to 108*a* and 105*b* to 108*b*, the architectures including components such as the software libraries 232 and 332 and traffic monitors 234 and 334.

In FIG. 6, the traffic monitors 234 and 334 on the sending endpoint 101 and receiving endpoint 102, respectively, periodically record the current status of the multiple physical interfaces 105*a* and 105*b* to 108*a* and 108*b*, monitoring such statistics as the number of dropped packets since the last observation, the number of packets received in error, and the number of collisions observed on this interface (600). If possible, knowledge of the link rate (capacity) and bandwidth consumed by observed traffic are used to calculate available bandwidth remaining for each of the physical interfaces. Known device profiles (i.e., combinations of available interfaces into logical and bondable virtual interfaces) are used to create a list of paths, in preferred order, using criteria such as, for example, available bandwidth, latency, observed or expected congestion, or perhaps all three. This list is used to negotiate the desired set of interfaces, which forms the bondable virtual interfaces 236 and 336, to use when playing back a media stream.

Assuming that the receiving endpoint 102 already has the correct URL for a data stream, the receiving endpoint 102 contacts the sending endpoint 101 to initiate playback of that URL. This playback request is accompanied by a list of preferred profiles to use for playback, as obtained from the traffic monitor 334 of the receiving endpoint 102 (601).

The sending endpoint 101 receives the playback request and the profile list, and uses its traffic monitor 234 to generate a sending side list of preferred profiles. The sending endpoint compares the profile lists looking for a good match, and communicates the chosen profile back to the receiving endpoint 102 (602).

The receiving endpoint 102 confirms (agrees) which paths are to be used, and requests the software library 332 instantiate the data combiner 338 with which to receive and reconstruct the expected media sub-streams (603). The sending endpoint 101 then receives the confirmation, and requests to have the software library 232 instantiate the data splitter 238 to handle the stream. Splitting and sending of the sub-streams over the multiple physical interfaces 105*a* and 105*b* to 108*a* and 108*b* then commences. In particular, the data splitter 238 splits the single data stream from the server application 501 into sub-streams via the bondable virtual interfaces 236 and 336 (604).

The data combiner then receives and reconstructs the stream, and passes it along to a player application for consumption on the sending endpoint (605). The data combiner 338 and/or the player application 502 generates feedback information, and sends it to the data splitter 238 in the sending endpoint 102 (606).

After playback is complete (signaled, perhaps, by an RTSP teardown command), the architectures on either side of the connection shutdown the connections and the associated data splitter 238 and the data combiner 338. The traffic monitors 234 and 334 continue to run periodically to update network statistics for a next data transfer.

Startup Sequence for Receiving Endpoint

Figure 7:
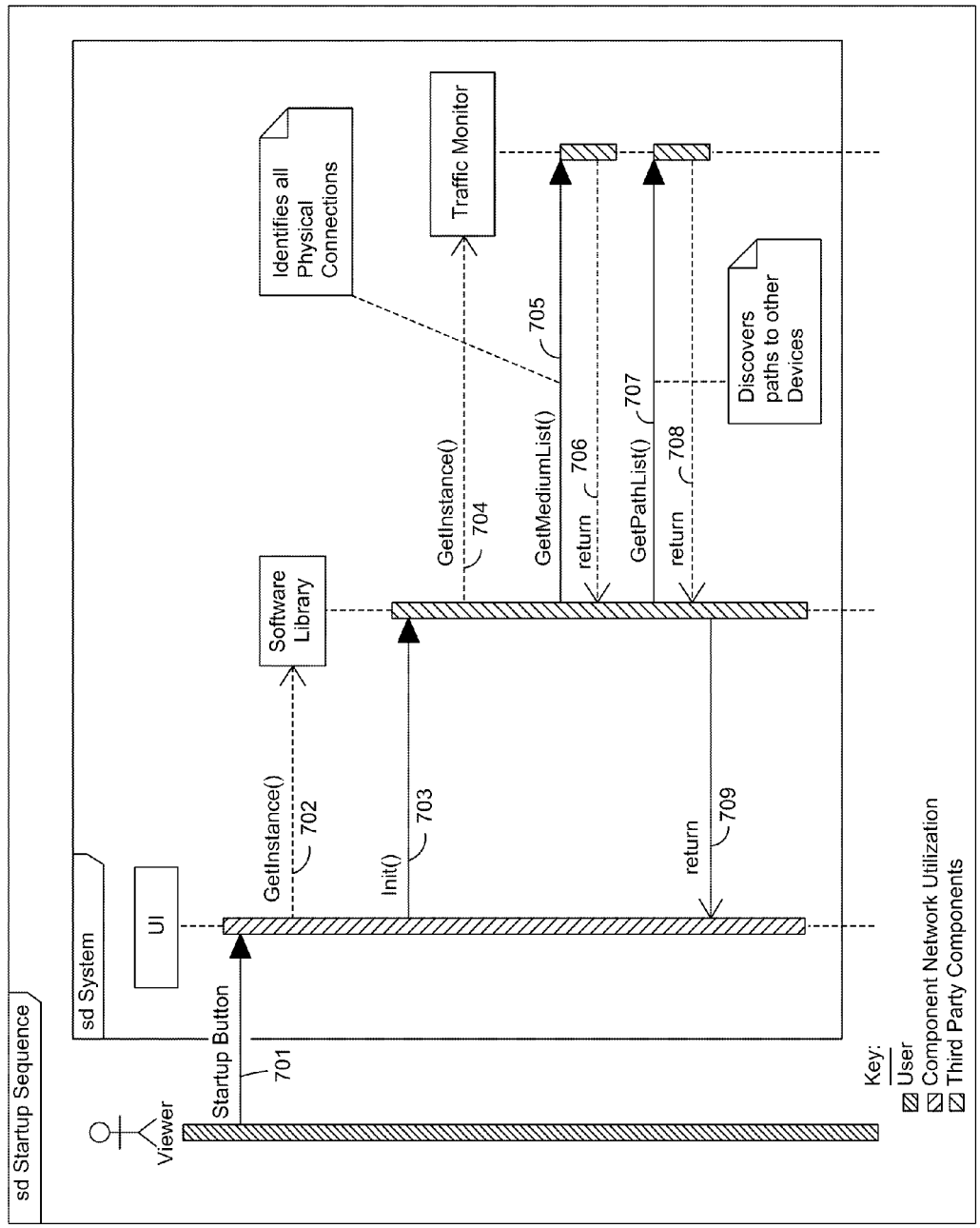
FIG. 7 shows a startup sequence diagram for the architecture on a receiving endpoint according to an example embodiment.

FIG. 7 shows a startup sequence diagram for the architecture on a receiving endpoint according to an example embodiment. As shown in FIG. 7, when a user powers-on a receiving endpoint, such as a set top box (STP) device, an application program such as application program 330 of FIG. 3 may start the architecture in the receiving endpoint 102 of FIG. 1. A set top box device is a hardware device that receives large media streams from a server, or in some cases sends large streams of data to a storage device (e.g., in the transferring of a video stream to be stored on a media server). The application program will get a handle to the architecture and call the init function. In the init function the software library will get a handle to the traffic monitor, and the software library will obtain information about the physical interfaces and the network paths.

More specifically, a user starts up the receiving endpoint 102 device, and a power-on sequence calls a start-up (701). Next, the application program calls the software library to obtain a reference (702), and uses the reference to call the init function (703). The software library then calls the traffic monitor to obtain a reference (704), and calls GetMediumList to obtain a list of the physical interfaces (705). The traffic monitor then returns the list of physical interfaces to the software library (706). The software library then calls a GetPathList( ) which discovers different paths to other devices (707). The traffic monitor then returns a list of the discovered paths to the software library (708), and the status of the init is returned to the application program (709).

Startup Sequence for Sending Endpoint

Figure 8:
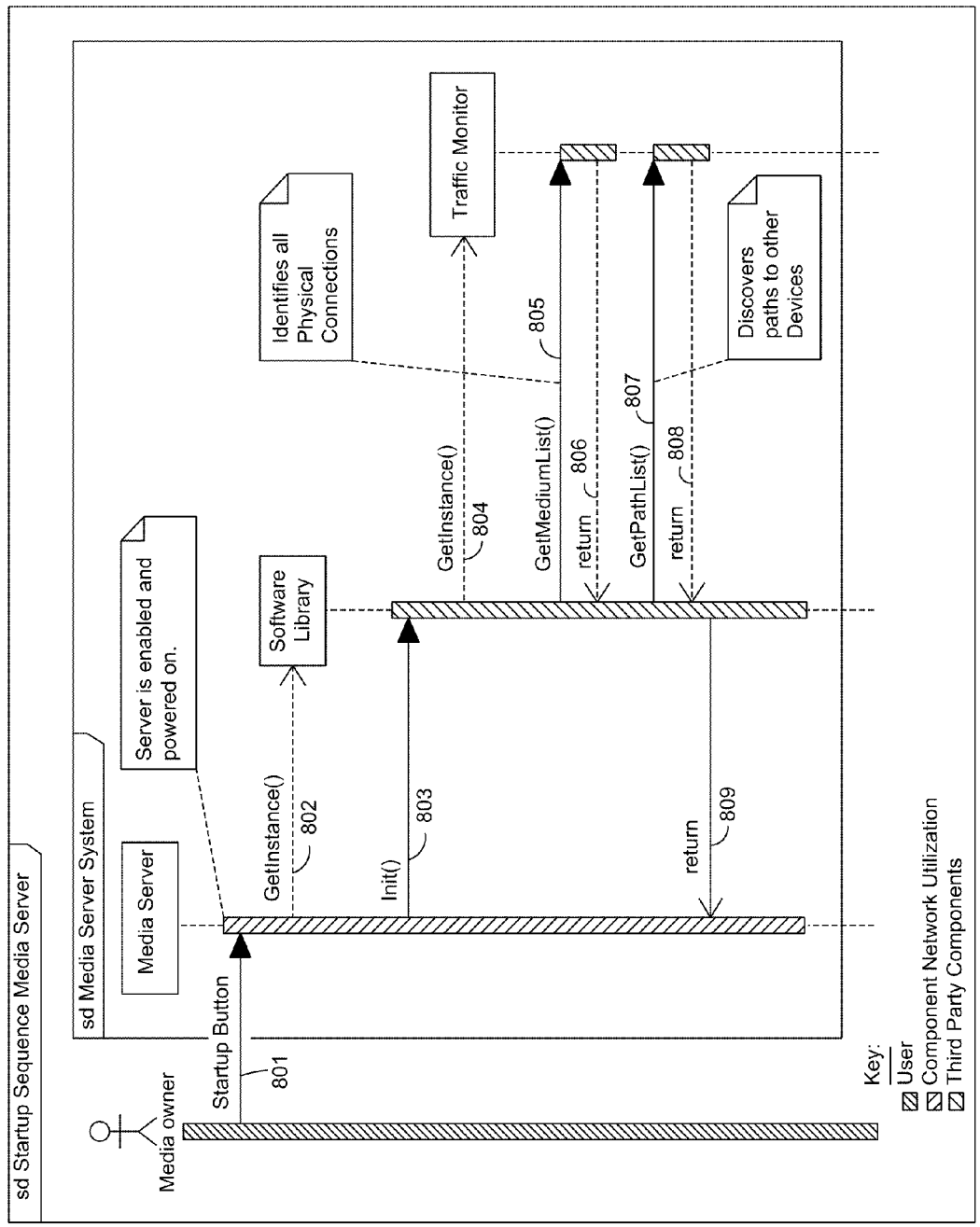
FIG. 8 shows a startup sequence diagram for a sending endpoint according to an example embodiment.

FIG. 8 shows a startup sequence diagram for a sending endpoint according to an example embodiment. As shown in FIG. 8, when a user starts the sending endpoint 101 of FIG. 1, an application program such as application program 230 of FIG. 2 will start the architecture in the sending endpoint 101. The application program will get a handle to the architecture and call the init function. In the init function, the software library will get a handle to the traffic monitor. The software library will then obtain information about the physical interfaces and the network paths.

More specifically, a user starts up the sending endpoint 101 device, and a power-on sequence calls a start-up (801). Next, the application program calls the software library to obtain a reference (802), and uses the reference to call the init function (803). The software library then calls the traffic monitor to obtain a reference (804), and calls GetMediumList to obtain a list of the physical interfaces (805). The traffic monitor then returns the list of physical interfaces to the software library (806). The software library then calls a GetPathList( ) which discovers different paths to other devices (807). The traffic monitor then returns a list of the discovered paths to the software (808), and the status of the init is returned to the application program (809).

With respect to FIGS. 7 and 8, the traffic monitors gather information from all the physical interfaces (e.g., bandwidth utilization), during initialization and periodically thereafter.

Shutdown Sequence

Figure 9:
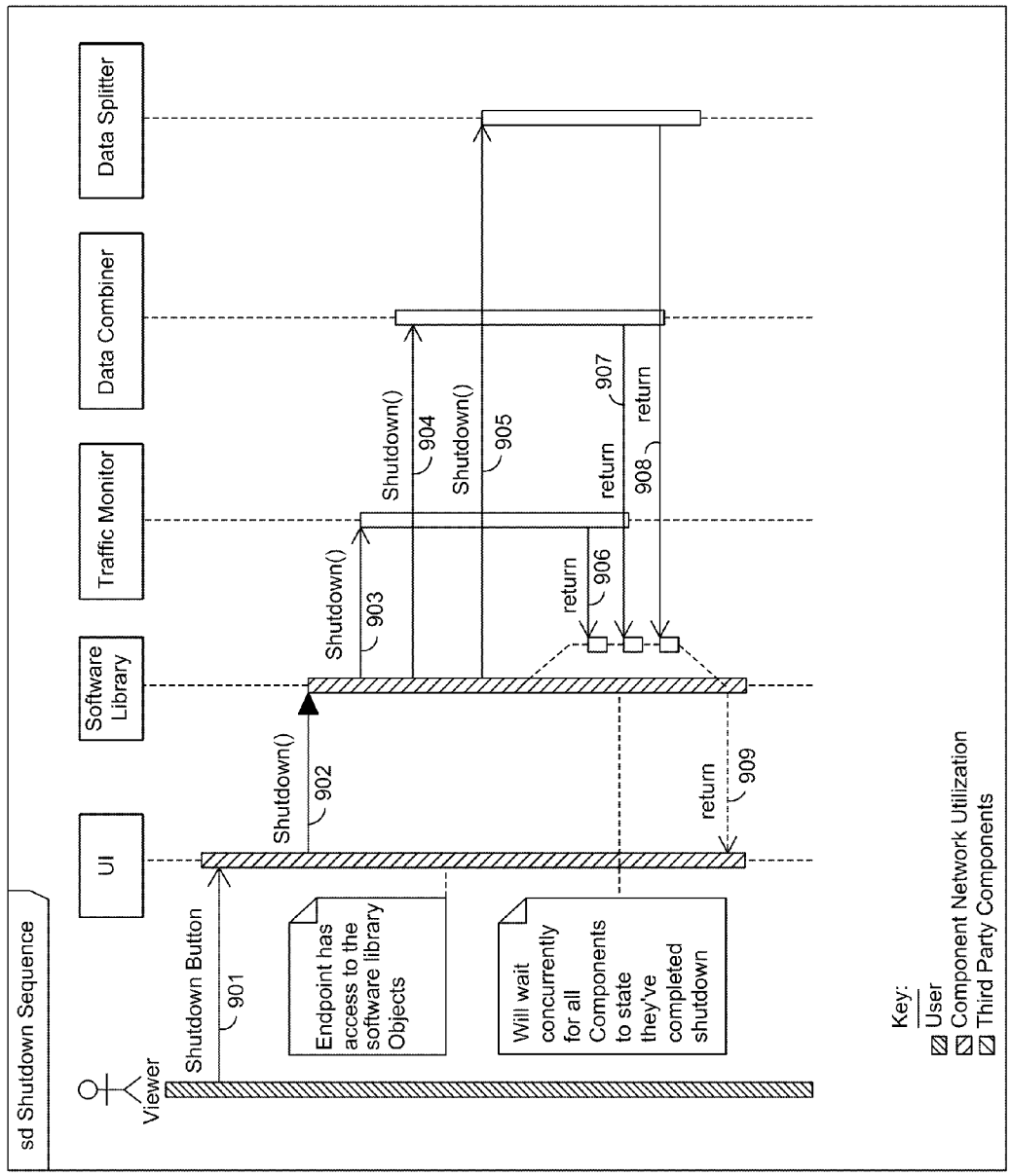
FIG. 9 shows a shutdown sequence diagram according to an example embodiment.

FIG. 9 shows a shutdown sequence diagram according to an example embodiment. As shown in FIG. 9, the application program, such as application program 230 or 330, which has a handle to the architecture can call the shutdown mechanism. The software library will call all of the components' (i.e., the traffic monitor's, the data combiner's or data splitter's) shutdown method. The software library will wait until all of the components return an OK before shutting down the architecture.

More specifically, a user initiates a quit (901), and the application program calls a software library shutdown function (902). Moreover, an asynchronous shutdown is sent to the traffic monitor (903), an asynchronous shutdown is sent to the data combiner (904), and/or an asynchronous shutdown is sent to the data splitter (the data splitter could have been invoked when the application sent data to a storage server) (905). These asynchronously sent messages allow the software library to continue running. Next, the traffic monitor sends a return status to the software library (906). This return is sent to the software library, where the software library is waiting for all the components to return their shutdown status. Then, the data combiner sends a return status to the software library (907), and the data splitter sends a return status to the software library (908). A status of the software library shutdown object is then returned to the application program (909).

Retrieve Media List

Figure 10:
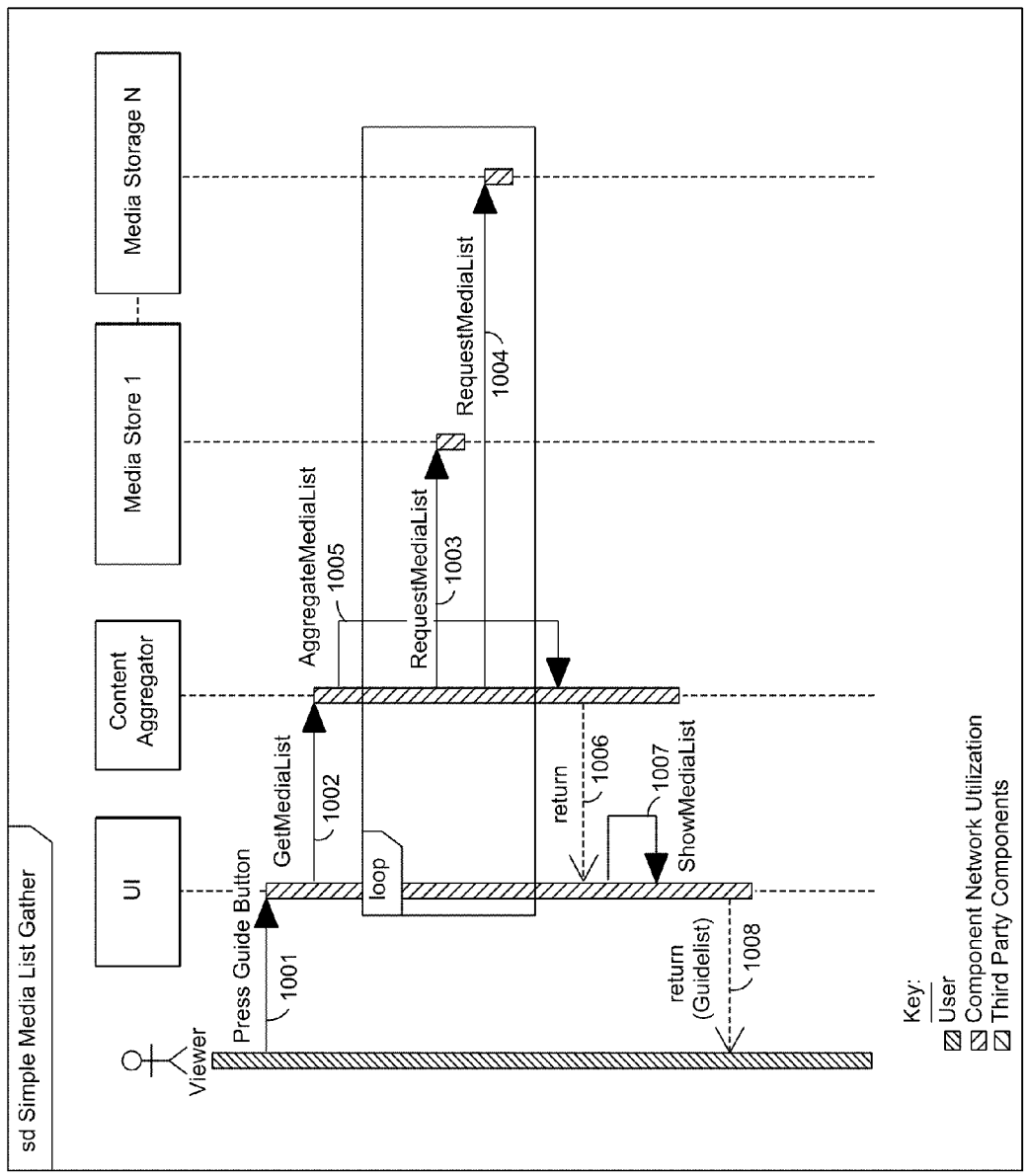
FIG. 10 shows a sequence diagram for gathering a list of media according to an example embodiment.

FIG. 10 shows a sequence diagram for gathering a list of media according to an example embodiment. This sequence diagram depicts a request for a movie or a media list from a content aggregator, which may include components not shown in FIG. 10. As shown in FIG. 10, a user presses a list button (e.g., a guide button), which is then sent to a user interface (UI) on a STB (1001). The UI then sends an appropriate message to a content aggregator (1002). The content aggregator then retrieves the media content by calling pertinent media stores for information (1003). The content aggregator calls more than one media store (for example, an N number of media stores), so as to obtain an extensive list of media content (1004). The aggregated list is then formed and returned to the STB's UI (1005). The STB UI processes the media list (1006), and the STB UI displays the media list (1007). The list is then returned to the software library (1008).

Streaming a Video

Figures 11, 11A:
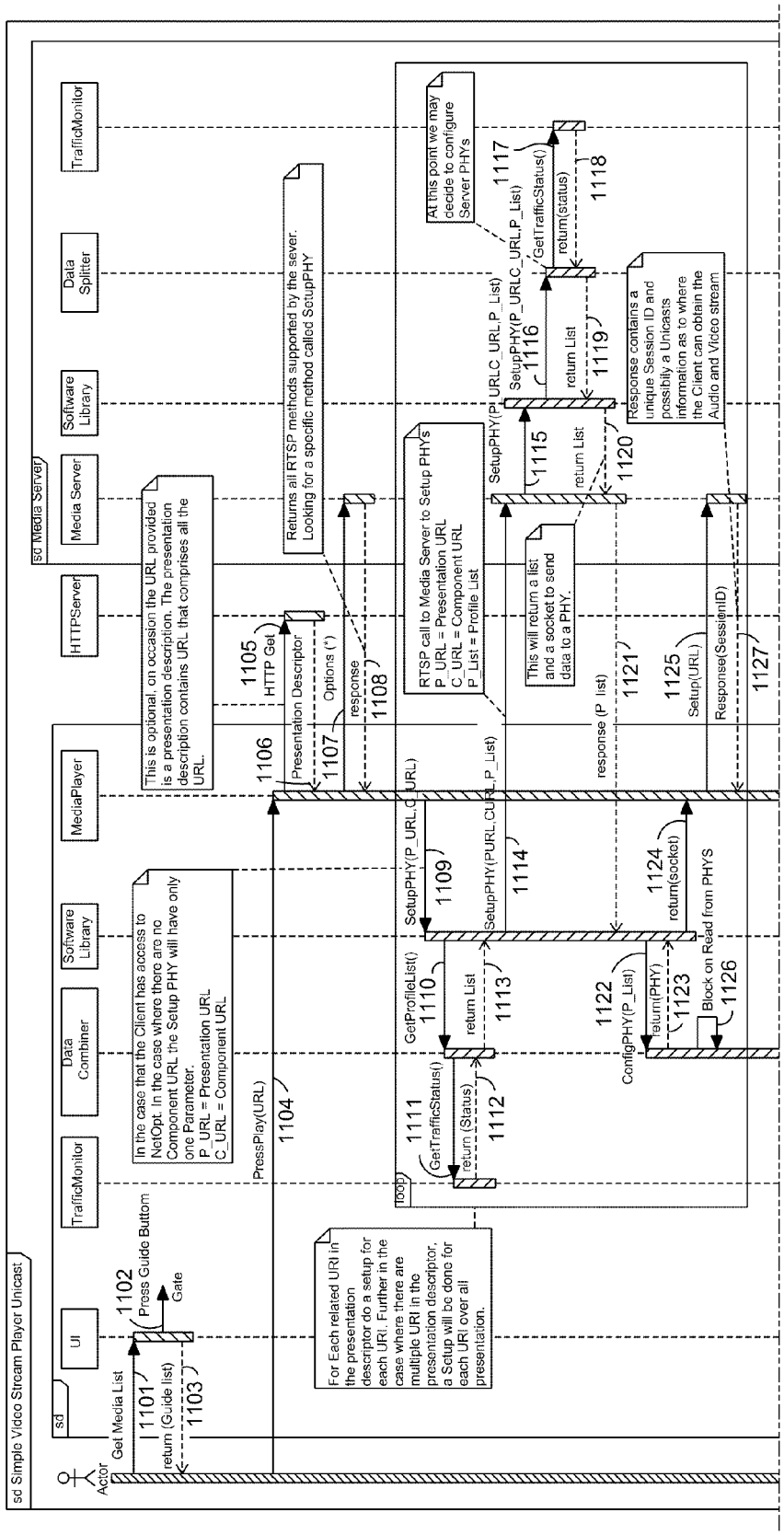
FIG. 11 shows a sequence diagram for streaming a video according to an example embodiment.

FIG. 11 shows a sequence diagram for streaming a video according to an example embodiment. The sequence diagram of FIG. 11 will be described in five sections, namely: (i) startup, (ii) setup, (iii) command, (iv) stream, and (v) teardown.

(i) Startup

As shown in FIG. 11A, a user presses a list button to obtain a media list, as described-above in more detail in connection with FIG. 10 (steps 1101 to 1103). The user selects a URL to play, and the receiving endpoint 102 is given the selected URL to play (1104). If the URL is a presentation descriptor, the receiving endpoint 102 asks another application for the information (e.g., an HTTP and RTSP server) (1105)(1106). The receiving endpoint 102 then sends, for example, a standard RTSP OPTIONS command to the sending endpoint 101 (1107). The OPTIONS command returns a list, for example, of RTSP methods available (which contains a Software Library RTSP extension command called "SetupPHY") (1108).

(ii) Setup

As shown in FIG. 11A, the receiving endpoint 102 calls the software library SetupPHY( ) method (1109), and the software library calls the GetProfileList( ) method of the data combiner (1110). During the process of getting the ProfileList, the data combiner calls the traffic monitor to GetTrafficStatus( ) (1111). The traffic monitor then returns the physical interface status in the form of a list (1112). The ProfileList may be a list of bondable virtual interfaces, and the list of bondable virtual interfaces may be in order of preference. On the other hand, the ProfileList may be a list of physical interfaces. The resulting ProfileList is then returned to the software library (1113). The software library makes a direct RTSP call to the sending endpoint 101, sending the list (1114). The sending endpoint 101 then calls the software library's SetupPHY( ) method, passing the list (1115), and calls the GetProfileList( ) method of the data splitter (1116). During the process of getting the ProfileList, the data splitter calls the traffic monitor to GetTrafficStatus( ) (1117). The traffic monitor then returns the physical interface status in the form of a list (1118). The ProfileList may be a list of bondable virtual interfaces, and the list of bondable virtual interfaces may be in order of preference. On the other hand, the ProfileList may be a list of physical interfaces. The resulting ProfileList is then returned to the software library (1119). The actual physical interfaces to be used for the data transfer are returned to the sending endpoint 101, which includes the list of sockets to be used to send the multiple substreams, and a single socket that will be used by the sending endpoint 101 to send the stream (1120). The single socket is an application channel 240. The sending endpoint 101 then responds to the RTSP call from step 1114, passing the actual connection information to be used (1121). This information is then passed to the ConfigurePHY( ) method of the data combiner, and used to create the socket that will be used to receive the data stream (1122). The sockets are then returned to the software library (1123), and then returned to the sending endpoint 101 (1124).

(iii) Command

As shown in FIG. 11A, an RTSP setup command is sent to the sending endpoint 101 to the receiving endpoint 102 (1125). Meanwhile, the data combiner is blocked, waiting for data (1126). The setup response is then returned, along with a unique SessionID (1127). As shown in FIG. 12B, the RTSP play command is then sent, using the unique SessionID (1128). The sending endpoint 101 calls the software library Play( ) method to begin playback of the data stream (1129). The software library then calls the data splitter's Send( ) method (1130 and 1131). The software library play method then completes (1133), and the sending endpoint 101 responds to the RTSP play command (1133). If there is more than one stream to be played (e.g., a separate audio and video stream), then steps 1125 to 1133 are executed for each stream.

(iv) Stream

Figure 11B:
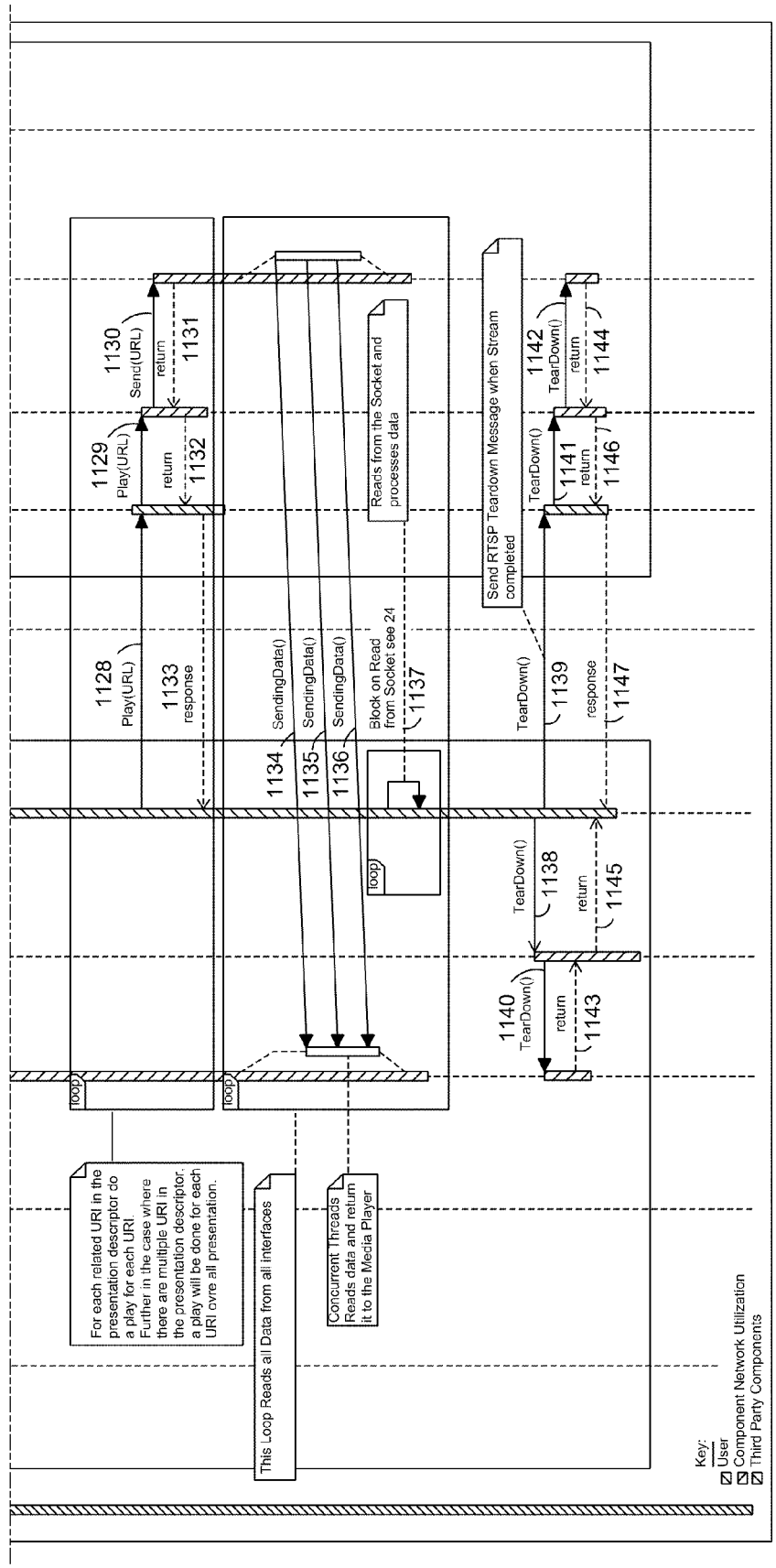

As shown in FIG. 11B, asynchronous calls are made passing portions of the data using the bondable virtual interface to transfer substreams from the sending endpoint's data splitter object over the one or more networks, to be received by the receiving endpoint's data combiner object (1134 to 1136). The receiving endpoint 102 then blocks, and continues to read from the single socket, which is an application channel 240, provided by the software library from step 1124, with the reconstructed stream (1137).

(v) Teardown

As shown in FIG. 11B, when the receiving endpoint 102 receives the end of the data stream, the receiving endpoint 102 calls the TearDown( ) method asynchronously (1138), and then immediately sends an RTSP teardown command to the sending endpoint 101 (1139). The software library of the receiving endpoint 102 then calls the data combiner's Teardown( ) method, and then waits for a response to the RTSP command (which will occur in step 1147) (1140, 1143 and 1145). The sending endpoint 101 then receives the RTSP teardown command and begins a similar process as used in steps 1140, 1143 and 1145, to tear down the data splitter (1141, 1142, 1144 and 1146).

For special play modes, such as fast-forward and reverse, the sequence diagram is the same as the above-described sequence diagram in FIG. 11, except that in the RTSP call to play, the scale is increased. More specifically, in a normal play mode the scale would be 1, while fast-forwarding would scale to a value greater than 1. In addition, a play mode in reverse would scale to a negative value. For example, a fast-forward of 2× would scale to 2, while a reverse 2× would scale to −2. In addition, special consideration should be given to scenarios where the receiving endpoint has a mass storage container (i.e., allowing for recording), where the data must be streamed in normal play speed (i.e., scale=1), and special play will take place in the streaming from the storage container. However, this special scenario is not the case for this example embodiment.

Whiteboard Conferencing

Figures 12, 12A:
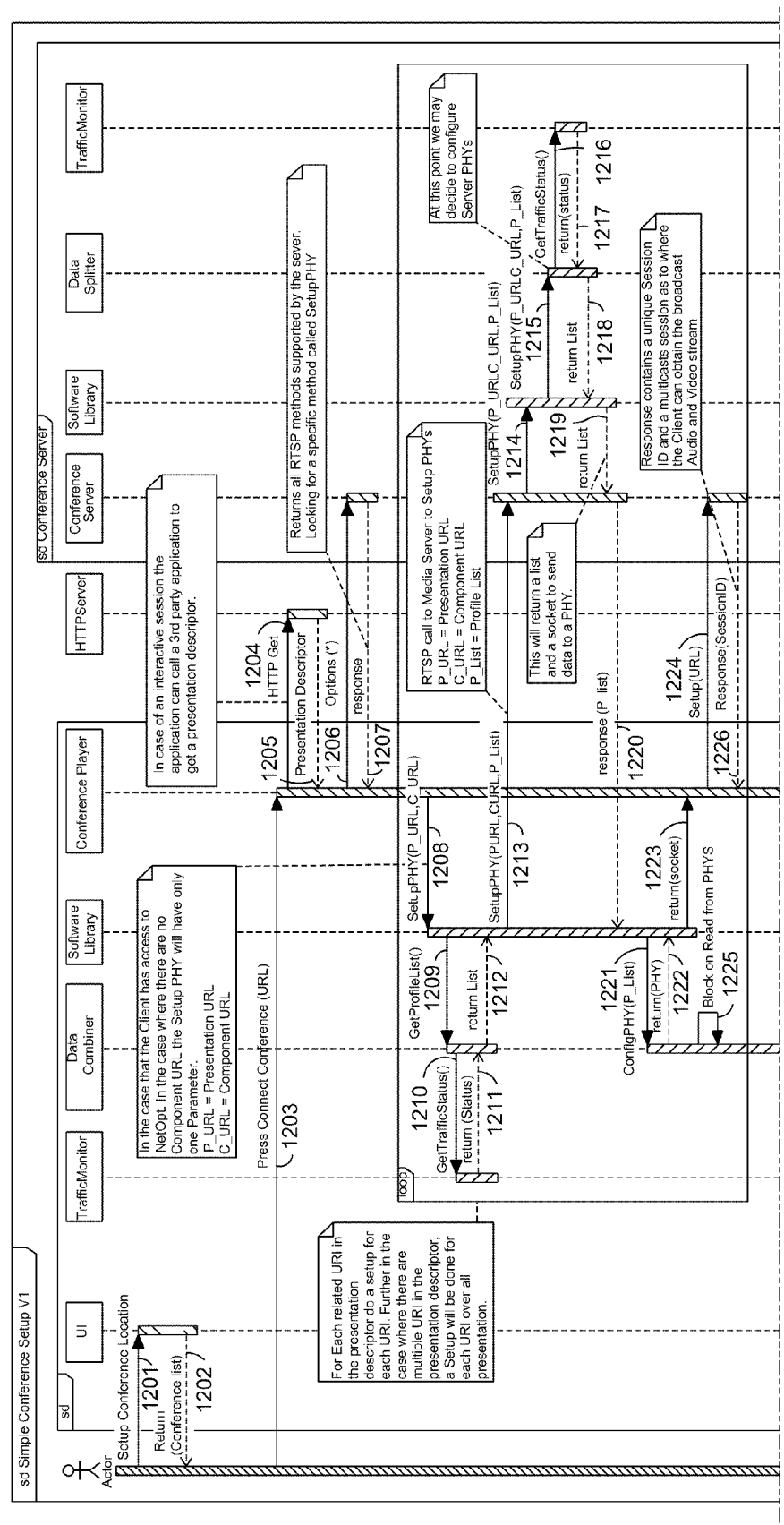
FIG. 12 shows a sequence diagram for streaming a video conference according to an example embodiment.
Figure 12B:
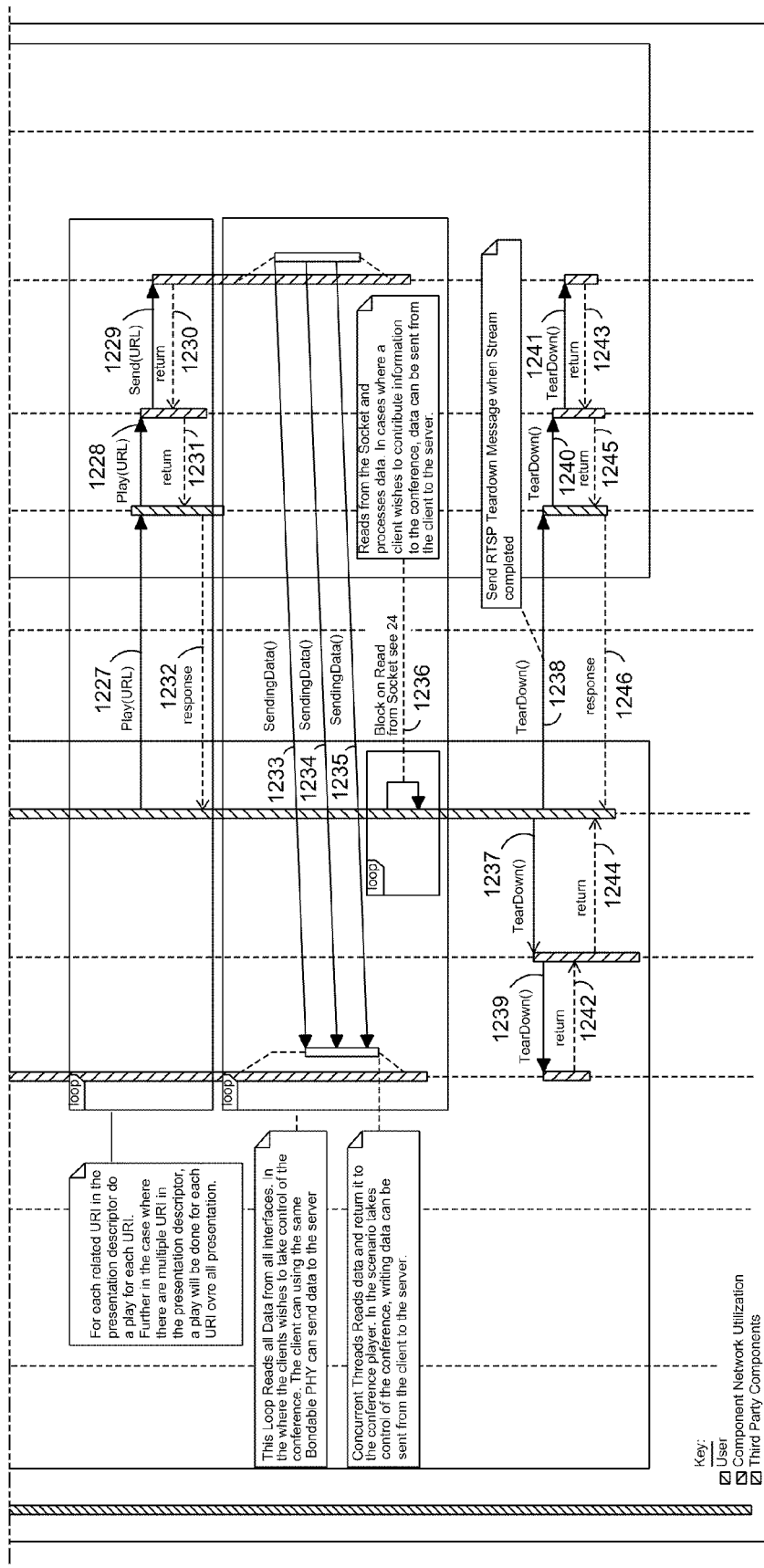

FIG. 12 shows a sequence diagram for streaming a video conference according to an example embodiment. The sequence diagram of FIG. 12 depicts the interaction of the architecture in a conference scenario. This scenario is similar to the video streaming scenario, except that the data can flow in both directions. This sequence diagram will also be described in five sections, namely: (i) startup, (ii) setup, (iii) command, (iv) stream, and (v) teardown.

(i) Startup

As shown in FIG. 12A, a user calls a setup conference location (1201), and a conference list is then returned to the user (1202). A URL is then given to the receiving endpoint 102 (1203), and the receiving endpoint 102 optionally requests to get a presentation descriptor (1204 and 1205). The receiving endpoint 102 then sends, for example, a standard RTSP OPTIONS command to the sending endpoint 101 (1206). The OPTIONS command returns a list, for example, of RTSP methods available (which will contain a Software Library RTSP extension command called 'SetupPHY') (1207).

(ii) Setup

As shown in FIG. 12A, the receiving endpoint 102 calls the software library SetupPHY( ) method (1208). The software library then calls a GetProfileList( ) method of the data combiner (1209). During the process of getting the ProfileList, the data combiner calls the traffic monitor to GetTrafficStatus( ) (1210). The traffic monitor then returns a status for each of the physical interfaces in the form of a list (1211), and the resulting ProfileList is returned to the software library (1212). The ProfileList may be a list of bondable virtual interfaces, and the list of bondable virtual interfaces may be in order of preference. On the other hand, the ProfileList may be a list of physical interfaces. The software library of the receiving endpoint 102 then makes a direct RTSP call to the sending endpoint 101, sending the list (1213). The sending endpoint 101 then calls its software library's SetupPHY( ) method, passing the list (1214). The software library then calls a GetProfileList( ) method of the data splitter (1215). During the process of getting the ProfileList, the data combiner calls the traffic monitor to GetTrafficStatus( ) (1216). The traffic monitor then returns a status for each of the physical interfaces in the form of a list (1217), and the resulting ProfileList is returned to the software library (1218). The ProfileList may be a list of bondable virtual interfaces, and the list of bondable virtual interfaces may be in order of preference. On the other hand, the ProfileList may be a list of physical interfaces. The actual physical interfaces to be used for the transfer are returned to the sending endpoint 101, which includes the list of sockets to be used to send the multiple substreams, and a single socket that will be used by the sending endpoint 101 to send the data stream (1219). The single socket is an application channel 240. The sending endpoint 101 then responds to the RTSP call from step 1213, passing the actual connection information to be used to the receiving endpoint 102 (1220). This information is then passed to a ConfigurePHY( ) method of the data combiner, and used to create the socket that will be used to receive the data stream (1221). The sockets are then returned to the software library of the receiving endpoint 102 (1222), and then to the receiving endpoint 102 (1223).

(iii) Command

As shown in FIG. 12A, an RTSP setup command is then sent to the sending endpoint 101 (1224). Meanwhile, the data combiner is blocked, waiting for data (1225). The setup response is then returned, along with a unique SessionID (1226). As shown in FIG. 12B, the RTSP command is then sent to the sending endpoint 101, using the unique SessionID from step 1226 (1227). The sending endpoint 101 then calls a software library Play( ) method to begin playback of the data stream (1228). The software library of the sending endpoint 101 then calls the data splitter's Send( ) method (1229 and 1230). The software library Play( ) method then completes (1231), and the sending endpoint 101 responds to the RTSP play command (1232). If there is more than one stream to be played (e.g., separate audio and video streams), then steps 1224 to 1232 are then executed for each stream.

(iv) Stream

As shown in FIG. 12B, asynchronous calls are made passing portions of the data using the bondable virtual interface to transfer substreams from the sending endpoint's data splitter object over the one or more networks, to be received by the receiving endpoint's data combiner object (1233 to 1235). The sending endpoint 102 blocks, and continues to read from the single socket provided by the software library (from step 1223), with the reconstructed stream (1236).

(v) Teardown

As shown in FIG. 12B, when the receiving endpoint 102 receives the end of the data stream, the receiving endpoint calls a TearDown( ) method asynchronously, and then immediately sends an RTSP teardown command to the sending endpoint 101 (1238). The software library on the receiving endpoint 102 calls the data combiner's TearDown( ) method, and then waits for the response to the RTSP command (which will occur in step 1246) (1239, 1242 and 1244). The sending endpoint 101 then receives the RTSP teardown command and begins a similar process as used in steps 1239, 1242 and 1244, to tear down the data splitter (1240, 1241, 1243 and 1245).

In general, the entire process of FIG. 12 may occur simultaneously in the opposite direction. In other words, the process of FIG. 12 may occur in the direction from the sending endpoint to the receiving endpoint, and may also occur simultaneously in the direction from the receiving endpoint. In addition, in the process of FIG. 12, the sending endpoint and the receiving endpoint may trade roles. For example, if a viewer on a receiving endpoint takes control of a conferencing session, the software library can be used to stream inputs from this viewer (now the sending endpoint) to the receiving endpoint.

In the above description with respect to FIGS. 2 to 12, use of the software library can lead to certain efficiencies and programming conveniences, but its use is not mandatory and other libraries can be used, or no library at all, so long as the features of the claims are achieved. A more detailed discussion of the software library can be found in U.S. application Ser. No. 12/463,366, filed May 8, 2009, titled "Efficient Network Utilization Using Multiple Physical Interfaces", by Martin Martinez, et al., the content of which is incorporated by reference herein.

Network Streaming Over Multiple Physical Interfaces

Figure 13:
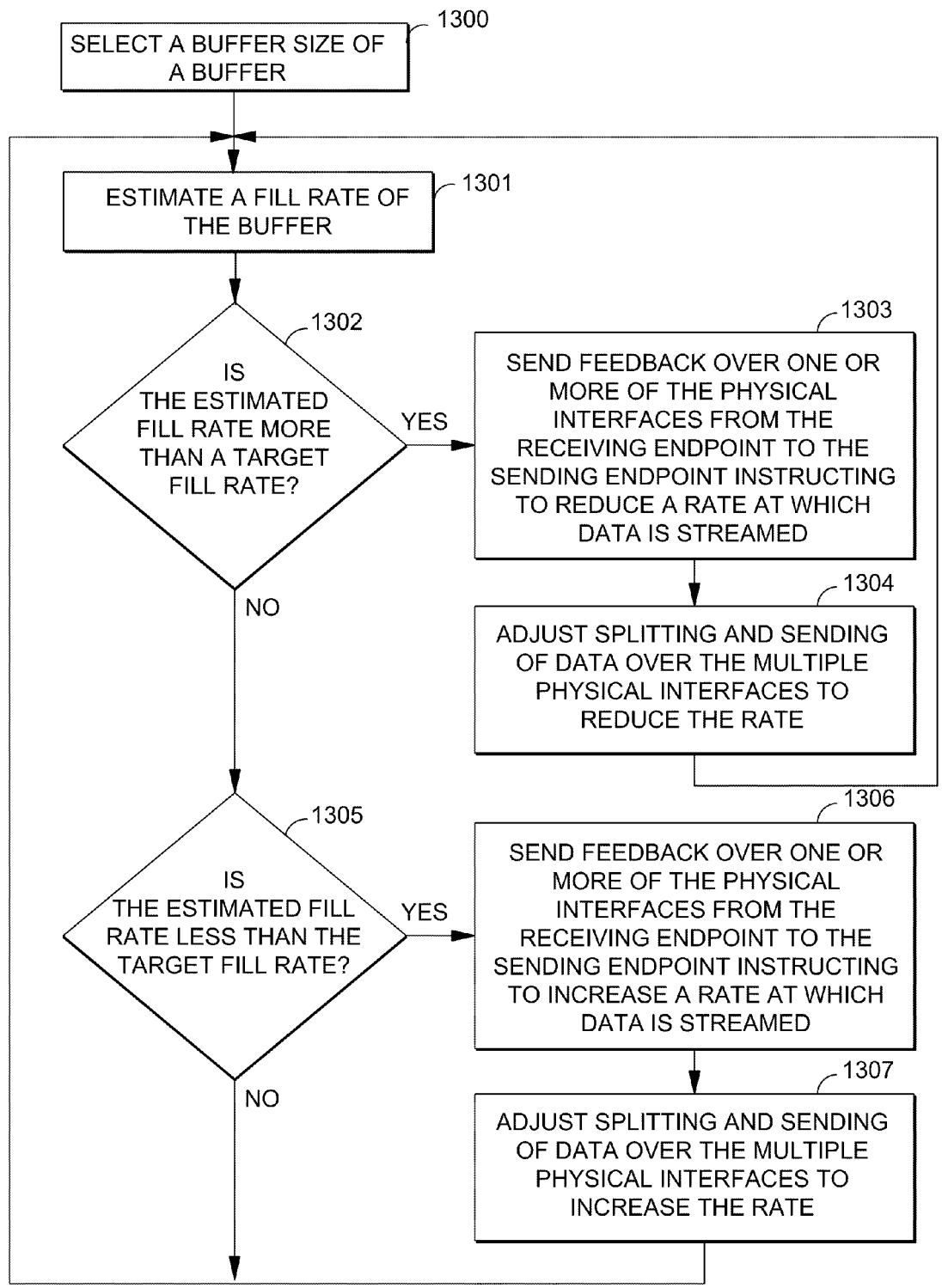
FIG. 13 is a flow chart for providing a detailed explanation of another example embodiment.

FIG. 13 is a flowchart for providing a detailed explanation of another example embodiment. More specifically, FIG. 13 depicts a flowchart for providing a detailed explanation of an example embodiment for controlling a sending of a single data stream from a sending endpoint 101 to a receiving endpoint 102 as shown in FIG. 1. Both of the sending endpoint 101 and the receiving endpoint 102 each have multiple physical interfaces (105a and 105b to 108a and 108b of FIG. 1) connecting the sending endpoint 101 and the receiving endpoint 102 to one or more networks 111 to 114 of FIG. 1, respectively. In this example embodiment, the data stream is split and sent over the multiple physical interfaces such as multiple physical interfaces 105a and 105b to 108a and 108b.

In this example embodiment, the receiving endpoint 102 is an embedded system. However, in other example embodiments, the receiving endpoint 102 may not be an embedded system, and may be, for example, a general purpose computer such as a personal computer (PC). The embedded system in this example embodiment has an architecture that includes a bus which is shared by a CPU and multiple other interfaces. More particularly, and as shown in FIG. 3B, the embedded system includes system bus 395. As shown in FIG. 3B, system bus 395 is shared by, for example, CPU 302, wired network interface(s) 105b, wireless network interface(s) 106b, MoCA network interface(s) 107b, powerline network interface(s) 108b, HDD controller 391 and HDD 390.

As shown in FIG. 13, in block 1300, a buffer size is selected for a buffer (e.g., buffer 360 as shown in FIGS. 3A and 3B) at the receiving endpoint 102. The buffer size for the buffer is selected based at least partially on a data playback rate of the streaming data and a typical feedback response time for feedback sent from the receiving endpoint 102 to the sending endpoint 101. The data playback rate of the streaming data is determined by observing a rate at which the application program 330 of the receiving endpoint 102 is pulling data from the buffer to, for example, play a video from the streamed data. For example, if the application program 330 is pulling 5 Mb of data from the buffer every second, then the data playback rate is 5 Mb/sec. In addition, the typical feedback response time is roughly equivalent to a round trip time (RTT) from the receiving endpoint 102 to the sending endpoint 101, for data being sent over the particular physical interfaces being used to provide feedback. Thus, in the example described above, if a typical RTT is around 500 ms and the data playback rate is 5 Mb/sec, a buffer size of around 15 Mb may be selected, so that the buffer provides a cushion of memory to allow the sending of the data stream to be adjusted before, for example, the buffer incurs data overflow.

In the foregoing example, any chosen buffer should have at least 2.5 Mb of data stored in it, so as to handle a worst case scenario of no data being received at all. In addition, in this worst case scenario, a feedback message should be sent quickly by the receiving endpoint to instruct the sending endpoint to send more data. In this example, the 2.5 Mb is a minimum amount of data that should be in the buffer, since the system probably cannot detect the instant that data stops being received, because normal data reception will include some timing variation. Thus, a reasonable solution would be to take a minimum (e.g., 5 Mb/s×500 ms=2.5 Mb), and multiply the minimum by some safety factor to compensate for imperfect detection of an interruption in data recombination. In the example described above, a safety factor of 3 is used to calculate a minimum of 7.5 Mb of data.

Moreover, the buffer in the above example may, at any instant, contain a particular amount of data. If the playback application were to suddenly stop drawing data from the buffer (e.g., a user hits pause), the system should detect this, and send a feedback message to the sending endpoint. Sending the feedback message will hopefully prevent the buffer from overflowing before the sender stops/reduces the sending rate. Therefore, the buffer in this example should have, at a minimum, 500 ms @ 5 Mb/s of marginal empty space, or "headroom", to store data that is received after such feedback is sent, but before the sending endpoint stops sending. Again, a safety factor of 3 is used to calculate 7.5 Mb of headroom.

Thus, in the above described example, with a target fill rate of 0 Mb/s, and a buffer that is usually half full (in the fixed case), and the buffer should have a total size of 6 RTT of data, or about 15 Mb of capacity. A high water mark in this case might be $5/6^{th}$ of the buffer (i.e., 5 RTTs, with 1 RTT headroom), and a low water mark would be no lower than 1 RTT. The selected size of the buffer may be more conservative than previously described, so as to even further prevent any underruns or overruns of data. Moreover, the delay associated with the buffer will correspond to an amount of data in the buffer, which is about 3 RTT in the foregoing example, or about 1.5 seconds.

In block 1301, an estimation is made by the receiving endpoint 102 of a fill rate of the buffer. More specifically, the fill rate is estimated by first estimating a data playback rate (i.e., consumption rate) of the data stored in the buffer. The data playback rate is estimated by the receiving endpoint 102 by observing a rate at which an application of the receiving endpoint 102 draws data from the buffer when the data is to be played. This rate that the application reads data from the buffer is the data playback rate. For example, if the application read 10 Mb of data per second, then the data playback rate would be 10 Mb/s. Then, an incoming data rate of the buffer is estimated. The incoming data rate is estimated by the receiving endpoint 102 by observing a rate at which data, which is received over the multiple physical interfaces 105b to 108b and recombined at the receiving endpoint 102, is placed in the buffer. In particular, a data combiner at the receiving endpoint 102 reassembles data received over the multiple physical interfaces 105b to 108b, and places the reassembled data in the buffer. The rate at which the data combiner places the data in the buffer is the incoming data rate. For example, if the data combiner places 20 Mb of data into the buffer per second, then the incoming data rate of the buffer is 20 Mb/sec. The estimated fill rate is then obtained by taking the difference between the estimated data playback rate and the estimated incoming data rate. In a simple example, if the incoming data rate is estimated to be 5 Mb/sec, and the data playback rate is estimated to be 4 Mb/sec, then the fill rate of the buffer would be around +1 Mb/sec. In this same example, if the incoming data rate is estimated to be 3 Mb/sec, and the data playback rate remains at 4 Mb/sec, then the fill rate of the buffer would be around −1 Mb/sec.

Then, a comparison is made between the estimated fill rate and a target fill rate in blocks 1302 and 1305. In one example embodiment, the target fill rate is zero. In other example embodiments, the target fill rate may be slightly more than zero or the target fill rate may be slightly less than zero.

In block 1302, if the estimated fill rate is more than the target fill rate, the process proceeds to block 1303. In block 1303, feedback is sent over one or more of the multiple physical interfaces from the receiving endpoint 102 to the sending endpoint 101 instructing to reduce a rate at which the data is streamed. An adjustment is then made, by the sending endpoint 101, to the splitting and sending of data over the multiple physical interfaces from the sending endpoint 101 to the receiving endpoint 102 so as to reduce the rate at which the data is streamed in accordance with the feedback (1304). Alternatively, the rate at which data is streamed may be temporarily halted. If in block 1302, the estimated fill rate is not more than the target fill rate, the process proceeds to block 1305.

In block 1304, the adjustment of splitting and sending of data over the multiple physical interfaces, to reduce the rate at which data is streamed, may be performed using a number of different methods. For example, the data may be apportioned away from physical interfaces having higher data capacity throughputs, and apportioned to physical interfaces having lower data capacity throughputs. Other methods of adjusting the splitting and sending of data to reduce the rate at which data is streamed may be found in U.S. application Ser. No. 12/463,367, titled "Network Streaming of a Single Data Stream Simultaneously Over Multiple Physical Interfaces", by Eric Riggert, et al., filed May 8, 2009, U.S. application Ser. No. 12/463,372, titled "Reliable Network Streaming of a Single Data Stream Over Multiple Physical Interfaces", by Martin Martinez, et al., filed May 8, 2009, and U.S. application Ser. No. 12/471,319, titled "Efficient Bandwidth Utilization When Streaming Data Over Multiple Physical Interfaces", by Martin Martinez, et al., filed May 22, 2009, the content of each of which is included by reference herein.

In block 1305, if the estimated fill rate is less than the target fill rate, then the process proceeds to block 1306. In block 1306, feedback is sent over one or more of the multiple physical interfaces from the receiving endpoint 102 to the sending endpoint 101 instructing to increase the rate at which the data is streamed. An adjustment is then made, by the sending endpoint 101, to the splitting and sending of data over the multiple physical interfaces from the sending endpoint 101 to the receiving endpoint 102 so as to increase the rate at which the data is streamed in accordance with the feedback (1307). If in block 1305, the estimated fill rate is not less than the target fill rate, the process returns to block 1301.

In block 1307, the adjustment of splitting and sending of data over the multiple physical interfaces, to increase the rate at which data is streamed, may be performed using a number of different methods. For example, the data may be apportioned away from physical interfaces having lower data capacity throughputs, and apportioned to physical interfaces having higher data capacity throughputs. Other methods of adjusting the splitting and sending of data to increase the rate at which data is streamed may be found in U.S. application Ser. No. 12/463,367, titled "Network Streaming of a Single Data Stream Simultaneously Over Multiple Physical Interfaces", by Eric Riggert, et al., filed May 8, 2009, U.S. application Ser. No. 12/463,372, titled "Reliable Network Streaming of a Single Data Stream Over Multiple Physical Interfaces", by Martin Martinez, et al., filed May 8, 2009, and U.S. application Ser. No. 12/471,319, titled "Efficient Bandwidth Utilization When Streaming Data Over Multiple Physical Interfaces", by Martin Martinez, et al., filed May 22, 2009, the content of each of which is included by reference herein.

By virtue of the foregoing example embodiment, it is ordinarily possible to efficiently provide data playback for data being streamed from a sending endpoint to a receiving endpoint over multiple physical interfaces without relying on a large buffer at the receiving endpoint. More specifically, since feedback is provided from the receiving endpoint to the sending endpoint instructing to increase or reduce a rate at which data is being streamed when an estimated fill rate is less than or more than a target fill rate, respectively, for a buffer at the receiving endpoint, it is possible for a CPU on the receiving endpoint to operate within its limits, and not be overburdened. As a result, efficient and high quality streaming data can be provided, ordinarily without using mass storage and/or a fast/expensive CPU. Moreover, because the CPU is not being overburdened, and particularly for an embedded system, because the shared bus is not being congested with data, the receiving endpoint can play back data with little to no perceived delay, and with less delay between a user input and a response to the user's input.

In one situation, the buffer is an elastic embedded buffer included in the receiving endpoint 102. In this situation, if in step 1305 an underrun of data occurs in the elastic embedded buffer due to a short term variation in a data receive rate, the size of the elastic embedded buffer is increased. A request is then sent from the receiving endpoint 102 to the sending endpoint 101 for the sending endpoint 101 to send a burst transfer of data. Sending a burst transfer of data includes sending a larger portion of data than is currently being sent over the different multiple physical interfaces for a short period of time. As a result of increasing the size of the elastic embedded buffer, a likelihood of future underruns can be reduced. In addition, because the burst transfer of data is sent, there should be a sufficient amount of data in the buffer so as to provide a smooth playback of the data. Alternatively, playback of the data can be temporarily stopped to let the buffer fill up with enough data to provide a smooth playback of the data.

In another situation, if the elastic embedded buffer has not incurred an underrun of data for a predetermined period in block 1305, then the size of the elastic embedded buffer is reduced. The predetermined period is a number of determinations, or is an amount of time. For example, if after five determinations that an underrun of data has not occurred because the estimated fill rate is equal to or greater than the target fill rate, then the size of the elastic embedded buffer may be slightly reduced. In another example, if the buffer has not incurred an underrun for 10 minutes, then the size of the embedded buffer may be slightly reduced. The reduction in buffer size can minimize an overall delay in playback in the system, and will also reduce the buffer size to a minimum, given the current long-term network performance.

In the case that the buffer is an elastic embedded buffer, in step 1302, if an overrun of data occurs in the elastic embedded buffer due to a short term variation in a data receive rate, a request is sent from the receiving endpoint 102 to the sending endpoint 101 to resend any data that has overflowed and is not skippable. Data may be determined as not skippable if, for example, the data contains important I-frames of a video, skipping of which would result in detrimentally affecting the video quality. Alternatively, the buffer may be a fixed embedded buffer included in the receiving endpoint 102, which would be slightly larger than the size of an elastic buffer so as to minimize possible overflows of data.

In step 1302, in the case that the estimated fill rate is substantially less than the target fill rate, feedback is sent over one or more physical interfaces from the receiving endpoint 102 to the sending endpoint 101 instructing the sending endpoint 101 to send a burst of data. The burst data is to be sent from the sending endpoint 101 to the receiving endpoint 102 for an amount of time such that the buffer is replenished with data. In another case, the feedback is sent over one or more physical interfaces from the receiving endpoint to the sending endpoint instructing the sending endpoint to send a burst of data, after a prediction is made of a future underrun of data in the buffer.

The prediction of a future underrun of data in the buffer is made using the equation of $F_{RTT}=F+\Delta R \times RTT$, where $\Delta R$ is the fill rate at a given time (i.e., incoming data rate minus observed playback rate), F is the current amount of data in the buffer (i.e., fill amount), RTT is the reaction time for feedback sent from the receiving endpoint 102 to the sending endpoint 101 to be received and acted upon by the sending endpoint 101, and the receiving endpoint 102 then receiving a different amount of data, and $F_{RTT}$ is the fill amount F at time RTT. If this prediction is below a threshold (or even negative, indicating that the buffer has already run out of data), then a burst of data is requested by the receiving endpoint 102. If the value of $F_{RTT}$ is lower than the value of F (indicating that more data is consumed than received by the buffer), a different threshold is applied which may be a magnitude of a difference between the value of $F_{RTT}$ and the value of F, and a corresponding increase in a rate at which the data is sent is requested by the receiving endpoint 102. Also, during reception of a burst of data by the receiving endpoint 102, this one-time burst of data is not considered in calculating $\Delta R$.

Generally, sending a burst of data is used in two scenarios: (1) at the startup of sending data, to fill the buffer to a target level quickly before initiating playback, and (2) after a buffer underrun (i.e., the buffer has run out of data to play, and more data is needed quickly). In this second case, the burst of data can be sent after adjusting the size of the elastic buffer upward, to get a certain additional amount of data ready to play quickly.

In steps 1302 and 1303, in a case that the buffer with the selected buffer size receives more data than it can hold, the buffer discards overflowing data, and feedback is sent over one or more physical interfaces from the receiving endpoint 102 to the sending endpoint 101 instructing the sending endpoint 101 to resend the discarded data. The sending endpoint 101 may be instructed to resend the discarded data after a delay in time. For example, the sending endpoint 101 may be instructed to wait 5 seconds before resending the discarded data. Because the sending endpoint 101 resends the discarded data after a delay in time, a subsequent overflow of data caused by the resending of data may be prevented.

In step 1303, in a case that a packet of data sent from the sending endpoint has been lost or corrupted, and it is determined that the packet of data should be received by the receiving endpoint, feedback is sent from the receiving endpoint 102 to the sending endpoint 101 to resend the lost or corrupted packet of data. Alternatively, the lost or corrupted packet of data may simply be omitted from the playback stream. In some cases, the lost or corrupted of data should be received by the receiving endpoint 102 almost immediately. In these cases, the sending endpoint 101 is instructed to resend the packets of data to the receiving endpoint 102 as soon as possible.

In steps 1305 and 1306, if data in the buffer reaches a low water mark, then feedback is sent over one or more of the multiple physical interfaces from the receiving endpoint 102 to the sending endpoint 101 instructing to increase the rate at which the data is streamed. The low water mark is set at a point that provides enough time to adjust the rate at which data is streamed before an underrun of data occurs.

In steps 1302 and 1303, if data in the buffer reaches a high water mark, then feedback is sent over one or more of the multiple physical interfaces from the receiving endpoint 102 to the sending endpoint 101 instructing to decrease the rate at which the data is streamed. The high water mark is set at a point that provides enough time to adjust the rate at which data is streamed before an overrun of data occurs.

In other example embodiments, the buffer may be a DMA buffer included in hardware of each of the physical interfaces. In step 1300, when selecting a buffer size for the buffer, a number of slots in the DMA buffer to be apportioned, and a size of each slot, are selected based at least partially on a data playback rate of the streaming data, and a typical feedback response time for feedback sent from the receiving endpoint 102 to the sending endpoint 101.

This disclosure has provided a detailed description with respect to particular illustrative embodiments. It is understood that the scope of the appended claims is not limited to the above-described embodiments and that various changes and modifications may be made by those skilled in the relevant art without departing from the scope of the claims.

What is claimed is:

1. A method for controlling a sending of a single data stream from a sending endpoint to a receiving endpoint, wherein both of the sending endpoint and the receiving endpoint each have multiple physical interfaces connecting the sending endpoint and the receiving endpoint to one or more networks, respectively, and the data stream is split and sent over the multiple physical interfaces, the method comprising:
    selecting a buffer size for a buffer at the receiving endpoint;
    estimating a fill rate of the buffer;
    comparing the estimated fill rate with a target fill rate;
    in a case where the estimated fill rate is more than the target fill rate, sending feedback over one or more of the multiple physical interfaces from the receiving endpoint to the sending endpoint instructing to reduce a rate at which the data is streamed;
    in a case where the estimated fill rate is less than the target fill rate, sending feedback over one or more of the multiple physical interfaces from the receiving endpoint to the sending endpoint instructing to increase the rate at which the data is streamed; and
    adjusting the splitting and sending of data over the multiple physical interfaces from the sending endpoint to the receiving endpoint so as to reduce or increase the rate at which the data is streamed in accordance with the feedback.

2. A method according to claim 1, wherein the target fill rate is zero.

3. A method according to claim 1, wherein the receiving endpoint is an embedded system.

4. A method according to claim 3, wherein the embedded system has an architecture that includes a bus which is shared by a CPU and multiple other interfaces.

5. A method according to claim 1, wherein the buffer size for the buffer is selected based at least partially on a data playback rate of the streaming data, and a typical feedback response time for feedback sent from the receiving endpoint to the sending endpoint.

6. A method according to claim 1, wherein the buffer is an elastic embedded buffer included in the receiving endpoint.

7. A method according to claim 6, wherein if an underrun of data occurs in the elastic embedded buffer due to a short term variation in a data receive rate, the size of the elastic embedded buffer is increased, and a request is sent from the receiving endpoint to the sending endpoint for the sending endpoint to send a burst transfer of data.

8. A method according to claim 6, wherein if an overrun of data occurs in the elastic embedded buffer due to a short term variation in a data receive rate, a request is sent from the receiving endpoint to the sending endpoint to resend any data that has overflowed and is not skippable.

9. A method according to claim 6, wherein if the elastic embedded buffer has not incurred an underrun of data for a predetermined period, then the size of the elastic embedded buffer is reduced.

10. A method according to claim 9, wherein the predetermined period is a number of determinations, or is an amount of time.

11. A method according to claim 1, wherein the buffer is a fixed embedded buffer included in the receiving endpoint.

12. A method according to claim 1, wherein in the case where the estimated fill rate is substantially less than the target fill rate, feedback is sent over one or more physical interfaces from the receiving endpoint to the sending endpoint instructing the sending endpoint to send a burst of data from the sending endpoint to the receiving endpoint for an amount of time such that the buffer is replenished with data.

13. A method according to claim 12, wherein feedback is sent over one or more physical interfaces from the receiving endpoint to the sending endpoint instructing the sending endpoint to send a burst of data from the sending endpoint to the receiving endpoint for an amount of time such that the buffer is replenished with data, after a prediction is made of a future underrun of data in the buffer.

14. A method according to claim 1, wherein in a case that the buffer with the selected buffer size receives more data than it can hold, the buffer discards overflowing data, and feedback is sent over one or more physical interfaces from the receiving endpoint to the sending endpoint instructing the sending endpoint to resend the discarded data.

15. A method according to claim 14, wherein the sending endpoint is instructed to resend the discarded data after a delay in time.

16. A method according to claim 1, wherein in a case that a packet of data sent from the sending endpoint has been lost or corrupted, and it is determined that the packet of data should be received by the receiving endpoint, feedback is sent from the receiving endpoint to the sending endpoint to resend the lost or corrupted packet of data.

17. A method according to claim 1, wherein estimating the fill rate of the buffer comprises estimating a data playback rate of the data.

18. A method according to claim 17, wherein estimating the fill rate of the buffer further comprises estimating an incoming data rate of the buffer.

19. A method according to claim 1, wherein if data in the buffer reaches a low water mark, then feedback is sent over one or more of the multiple physical interfaces from the receiving endpoint to the sending endpoint instructing to increase the rate at which the data is streamed.

20. A method according to claim 1, wherein if data in the buffer reaches a high water mark, then feedback is sent over one or more of the multiple physical interfaces from the receiving endpoint to the sending endpoint instructing to decrease the rate at which the data is streamed.

21. A method according to claim 1, wherein the buffer is a DMA (direct memory access) buffer included in hardware of each of the physical interfaces.

22. A method according to claim 21, wherein when selecting a buffer size for the buffer, a number of slots in the DMA (direct memory access) buffer to be apportioned and a size of each slot are selected based at least partially on a data playback rate of the streaming data, and a typical feedback response time for feedback sent from the receiving endpoint to the sending endpoint.

23. A method for controlling a sending of a single data stream from a sending endpoint to a receiving endpoint, wherein both of the sending endpoint and the receiving endpoint each have multiple physical interfaces connecting the sending endpoint and the receiving endpoint to one or more networks, respectively, and the data stream is split and sent over the multiple physical interfaces, wherein in the method the sending endpoint performs the steps of:
adjusting the splitting and sending of data over the multiple physical interfaces from the sending endpoint to the receiving endpoint so as to reduce or increase the rate at which the data is streamed in accordance with feedback received from the receiving endpoint,
wherein the receiving endpoint selects a buffer size for a buffer at the receiving endpoint,
wherein the receiving endpoint estimates a fill rate of the buffer,
wherein the receiving endpoint compares the estimated fill rate with a target fill rate,
wherein in a case where the estimated fill rate is more than the target fill rate, the receiving endpoint sends feedback over one or more of the multiple physical interfaces to the sending endpoint instructing to reduce a rate at which the data is streamed, and
wherein in a case where the estimated fill rate is less than the target fill rate, the receiving endpoint sends feedback over one or more of the multiple physical interfaces to the sending endpoint instructing to increase the rate at which the data is streamed.

24. A method according to claim 23, wherein the target fill rate is zero.

25. A method according to claim 23, wherein the receiving endpoint is an embedded system.

26. A method according to claim 25, wherein the embedded system has an architecture that includes a bus which is shared by a CPU and multiple other interfaces.

27. A method according to claim 23, wherein the buffer size for the buffer is selected based at least partially on a data playback rate of the streaming data and a typical feedback response time for feedback sent from the receiving endpoint to the sending endpoint.

28. A method according to claim 23, wherein the buffer is an elastic embedded buffer included in the receiving endpoint.

29. A method according to claim 28, wherein if an underrun of data occurs in the elastic embedded buffer due to a short term variation in a data receive rate, the size of the elastic embedded buffer is increased, and a request is sent from the receiving endpoint to the sending endpoint for the sending endpoint to send a burst transfer of data.

30. A method according to claim 28, wherein if an overrun of data occurs in the elastic embedded buffer due to a short term variation in a data receive rate, a request is sent from the receiving endpoint to the sending endpoint to resend any data that has overflowed and is not skippable.

31. A method according to claim 28, wherein if the elastic embedded buffer has not incurred an underrun of data for a predetermined period, then the size of the elastic embedded buffer is reduced.

32. A method according to claim 31, wherein the predetermined period is a number of determinations, or is an amount of time.

33. A method according to claim 23, wherein the buffer is a fixed embedded buffer included in the receiving endpoint.

34. A method according to claim 23, wherein in the case where the estimated fill rate is substantially less than the target fill rate, feedback is sent over one or more physical interfaces from the receiving endpoint to the sending endpoint instructing the sending endpoint to send a burst of data from the sending endpoint to the receiving endpoint for an amount of time such that the buffer is replenished with data.

35. A method according to claim 34, wherein feedback is sent over one or more physical interfaces from the receiving endpoint to the sending endpoint instructing the sending endpoint to send a burst of data from the sending endpoint to the receiving endpoint for an amount of time such that the buffer is replenished with data, after a prediction is made of a future underrun of data in the buffer.

36. A method according to claim 23, wherein in a case that the buffer with the selected buffer size receives more data than it can hold, the buffer discards overflowing data, and feedback is sent over one or more physical interfaces from the receiving endpoint to the sending endpoint instructing the sending endpoint to resend the discarded data.

37. A method according to claim 36, wherein the sending endpoint is instructed to resend the discarded data after a delay in time.

38. A method according to claim 23, wherein in a case that a packet of data sent from the sending endpoint has been lost or corrupted, and it is determined that the packet of data should be received by the receiving endpoint, feedback is sent from the receiving endpoint to the sending endpoint to resend the lost or corrupted packet of data.

39. A method according to claim 23, wherein estimating the fill rate of the buffer comprises estimating a data playback rate of the data.

40. A method according to claim 39, wherein estimating the fill rate of the buffer further comprises estimating an incoming data rate of the buffer.

41. A method according to claim 23, wherein if data in the buffer reaches a low water mark, then feedback is sent over one or more of the multiple physical interfaces from the receiving endpoint to the sending endpoint instructing to increase the rate at which the data is streamed.

42. A method according to claim 23, wherein if data in the buffer reaches a high water mark, then feedback is sent over one or more of the multiple physical interfaces from the receiving endpoint to the sending endpoint instructing to decrease the rate at which the data is streamed.

43. A method according to claim 23, wherein the buffer is a DMA (direct memory access) buffer included in hardware of each of the physical interfaces.

44. A method according to claim 43, wherein when selecting a buffer size for the buffer, a number of slots in the DMA (direct memory access) buffer to be apportioned and a size of each slot are selected based at least partially on a data playback rate of the streaming data, and a typical feedback response time for feedback sent from the receiving endpoint to the sending endpoint.

45. A method for controlling a sending of a single data stream from a sending endpoint to a receiving endpoint, wherein both of the sending endpoint and the receiving endpoint each have multiple physical interfaces connecting the sending endpoint and the receiving endpoint to one or more networks, respectively, and the data stream is split and sent over the multiple physical interfaces, wherein in the method the receiving endpoint performs the steps of:

selecting a buffer size for a buffer at the receiving endpoint;
estimating a fill rate of the buffer;
comparing the estimated fill rate with a target fill rate;
in a case where the estimated fill rate is more than the target fill rate, sending feedback over one or more of the multiple physical interfaces to the sending endpoint instructing to reduce a rate at which the data is streamed; and
in a case where the estimated fill rate is less than the target fill rate, sending feedback over one or more of the multiple physical interfaces to the sending endpoint instructing to increase the rate at which the data is streamed,
wherein the sending endpoint adjusts the splitting and sending of data over the multiple physical interfaces from the sending endpoint to the receiving endpoint so as to reduce or increase the rate at which the data is streamed in accordance with the feedback.

46. A method according to claim 45, wherein the target fill rate is zero.

47. A method according to claim 45, wherein the receiving endpoint is an embedded system.

48. A method according to claim 47, wherein the embedded system has an architecture that includes a bus which is shared by a CPU and multiple other interfaces.

49. A method according to claim 45, wherein the buffer size for the buffer is selected based at least partially on a data playback rate of the streaming data, and a typical feedback response time for feedback sent from the receiving endpoint to the sending endpoint.

50. A method according to claim 45, wherein the buffer is an elastic embedded buffer included in the receiving endpoint.

51. A method according to claim 50, wherein if an underrun of data occurs in the elastic embedded buffer due to a short term variation in a data receive rate, the size of the elastic embedded buffer is increased, and a request is sent from the receiving endpoint to the sending endpoint for the sending endpoint to send a burst transfer of data.

52. A method according to claim 50, wherein if an overrun of data occurs in the elastic embedded buffer due to a short term variation in a data receive rate, a request is sent from the receiving endpoint to the sending endpoint to resend any data that has overflowed and is not skippable.

53. A method according to claim 50, wherein if the elastic embedded buffer has not incurred an underrun of data for a predetermined period, then the size of the elastic embedded buffer is reduced.

54. A method according to claim 53, wherein the predetermined period is a number of determinations, or is an amount of time.

55. A method according to claim 45, wherein the buffer is a fixed embedded buffer included in the receiving endpoint.

56. A method according to claim 45, wherein in the case where the estimated fill rate is substantially less than the target fill rate, feedback is sent over one or more physical interfaces from the receiving endpoint to the sending endpoint instructing the sending endpoint to send a burst of data from the sending endpoint to the receiving endpoint for an amount of time such that the buffer is replenished with data.

57. A method according to claim 56, wherein feedback is sent over one or more physical interfaces from the receiving endpoint to the sending endpoint instructing the sending endpoint to send a burst of data from the sending endpoint to the receiving endpoint for an amount of time such that the buffer is replenished with data, after a prediction is made of a future underrun of data in the buffer.

58. A method according to claim 45, wherein in a case that the buffer with the selected buffer size receives more data than it can hold, the buffer discards overflowing data, and feedback is sent over one or more physical interfaces from the receiving endpoint to the sending endpoint instructing the sending endpoint to resend the discarded data.

59. A method according to claim 45, wherein the sending endpoint is instructed to resend the discarded data after a delay in time.

60. A method according to claim 45, wherein in a case that a packet of data sent from the sending endpoint has been lost or corrupted, and it is determined that the packet of data should be received by the receiving endpoint, feedback is sent from the receiving endpoint to the sending endpoint to resend the lost or corrupted packet of data.

61. A method according to claim 45, wherein estimating the fill rate of the buffer comprises estimating a data playback rate of the data.

62. A method according to claim 61, wherein estimating the fill rate of the buffer further comprises estimating an incoming data rate of the buffer.

63. A method according to claim 45, wherein if data in the buffer reaches a low water mark, then feedback is sent over one or more of the multiple physical interfaces from the receiving endpoint to the sending endpoint instructing to increase the rate at which the data is streamed.

64. A method according to claim 45, wherein if data in the buffer reaches a high water mark, then feedback is sent over one or more of the multiple physical interfaces from the receiving endpoint to the sending endpoint instructing to decrease the rate at which the data is streamed.

65. A method according to claim 45, wherein the buffer is a DMA (direct memory access) buffer included in hardware of each of the physical interfaces.

66. A method according to claim 65, wherein when selecting a buffer size for the buffer, a number of slots in the DMA (direct memory access) buffer to be apportioned and a size of each slot are selected based at least partially on a data playback rate of the streaming data and a typical feedback response time for feedback sent from the receiving endpoint to the sending endpoint.

67. A sending endpoint comprising:
a non-transitory computer-readable memory constructed to store computer-executable process steps; and
a processor constructed to execute the computer-executable process steps stored in the memory,
wherein the process steps in the memory cause the processor to control a sending of a single data stream from the sending endpoint to a receiving endpoint, wherein both of the sending endpoint and the receiving endpoint each have multiple physical interfaces connecting the sending endpoint and the receiving endpoint to one or more networks, respectively, and the data stream is split into a series of data packets and sent over the multiple physical interfaces, and wherein the process steps stored in the memory include computer-executable steps to:
adjust the splitting and sending of data over the multiple physical interfaces from the sending endpoint to the receiving endpoint so as to reduce or increase the rate at which the data is streamed in accordance with feedback received from the receiving endpoint,
wherein the receiving endpoint selects a buffer size for a buffer at the receiving endpoint, wherein the receiving endpoint estimates a fill rate of the buffer, wherein the receiving endpoint compares the estimated fill rate with a target fill rate, wherein in a case where the estimated fill rate is more than the target fill rate, the receiving endpoint sends feedback over one or more of the multiple physical interfaces to the sending endpoint instructing to reduce a rate at which the data is streamed, and wherein in a case where the estimated fill rate is less than the target fill rate, the receiving endpoint sends feedback over one or more of the multiple physical interfaces to the sending endpoint instructing to increase the rate at which the data is streamed.

68. A receiving endpoint comprising:

a non-transitory computer-readable memory constructed to store computer-executable process steps; and a processor constructed to execute the computer-executable process steps stored in the memory, wherein the process steps in the memory cause the processor to control a sending of a single data stream from a sending endpoint to the receiving endpoint, wherein both of the sending endpoint and the receiving endpoint each have multiple physical interfaces connecting the sending endpoint and the receiving endpoint to one or more networks, respectively, and the data stream is split into a series of data packets and sent over the multiple physical interfaces, and wherein the process steps stored in the memory include computer-executable steps to:

select a buffer size for a buffer at the receiving endpoint;

estimate a fill rate of the buffer;

compare the estimated fill rate with a target fill rate;

in a case where the estimated fill rate is more than the target fill rate, send feedback over one or more of the multiple physical interfaces to the sending endpoint instructing to reduce a rate at which the data is streamed; and in a case where the estimated fill rate is less than the target fill rate, send feedback over one or more of the multiple physical interfaces to the sending endpoint instructing to increase the rate at which the data is streamed, wherein the sending endpoint adjusts the splitting and sending of data over the multiple physical interfaces from the sending endpoint to the receiving endpoint so as to reduce or increase the rate at which the data is streamed in accordance with the feedback.

69. A non-transitory computer-readable memory medium on which is stored computer-executable process steps for causing a processor to control sending of a single data stream from a sending endpoint to a receiving endpoint, wherein both of the sending endpoint and the receiving endpoint each have multiple physical interfaces connecting the sending endpoint and the receiving endpoint to one or more networks, respectively, and the data stream is split into a series of data packets and sent over the multiple physical interfaces, the process steps comprising:

adjusting the splitting and sending of data over the multiple physical interfaces from the sending endpoint to the receiving endpoint so as to reduce or increase the rate at which the data is streamed in accordance with feedback received from the receiving endpoint, wherein the receiving endpoint selects a buffer size for a buffer at the receiving endpoint, wherein the receiving endpoint estimates a fill rate of the buffer, wherein the receiving endpoint compares the estimated fill rate with a target fill rate, wherein in a case where the estimated fill rate is more than the target fill rate, the receiving endpoint sends feedback over one or more of the multiple physical interfaces to the sending endpoint instructing to reduce a rate at which the data is streamed, and wherein in a case where the estimated fill rate is less than the target fill rate, the receiving endpoint sends feedback over one or more of the multiple physical interfaces to the sending endpoint instructing to increase the rate at which the data is streamed.

70. A non-transitory computer-readable memory medium on which is stored computer-executable process steps for causing a processor to control sending of a single data stream from a sending endpoint to a receiving endpoint, wherein both of the sending endpoint and the receiving endpoint each have multiple physical interfaces connecting the sending endpoint and the receiving endpoint to one or more networks, respectively, and the data stream is split into a series of data packets and sent over the multiple physical interfaces, the process steps comprising:

selecting a buffer size for a buffer at the receiving endpoint;

estimating a fill rate of the buffer;

comparing the estimated fill rate with a target fill rate;

in a case where the estimated fill rate is more than the target fill rate, sending feedback over one or more of the multiple physical interfaces to the sending endpoint instructing to reduce a rate at which the data is streamed; and in a case where the estimated fill rate is less than the target fill rate, sending feedback over one or more of the multiple physical interfaces to the sending endpoint instructing to increase the rate at which the data is streamed, wherein the sending endpoint adjusts the splitting and sending of data over the multiple physical interfaces from the sending endpoint to the receiving endpoint so as to reduce or increase the rate at which the data is streamed in accordance with the feedback.

* * * * *